United States Patent
Ochi et al.

(10) Patent No.: US 9,200,093 B2
(45) Date of Patent: Dec. 1, 2015

(54) POLYMERIZATION METHOD USING SURFACTANT-CONTAINING PARTICLE

(71) Applicant: Sumitomo Chemical Company, Limited, Tokyo (JP)

(72) Inventors: Naoko Ochi, Chiba (JP); Shinyo Tamura, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/356,497

(22) PCT Filed: Dec. 6, 2012

(86) PCT No.: PCT/JP2012/082273
§ 371 (c)(1),
(2) Date: May 6, 2014

(87) PCT Pub. No.: WO2013/085074
PCT Pub. Date: Jun. 13, 2013

(65) Prior Publication Data
US 2014/0288251 A1     Sep. 25, 2014

(30) Foreign Application Priority Data
Dec. 7, 2011 (JP) .................................. 2011-267592

(51) Int. Cl.
*C08F 4/02* (2006.01)
*C08F 4/649* (2006.01)
*C08F 4/6592* (2006.01)
*C08F 10/00* (2006.01)
*C08F 4/76* (2006.01)
*C08L 71/02* (2006.01)
*C08F 210/16* (2006.01)
*C08F 4/52* (2006.01)
*C08F 4/659* (2006.01)

(52) U.S. Cl.
CPC ... *C08F 4/76* (2013.01); *C08F 4/02* (2013.01); *C08F 4/52* (2013.01); *C08F 4/6494* (2013.01); *C08F 210/16* (2013.01); *C08L 71/02* (2013.01); *C08F 4/6592* (2013.01); *C08F 4/65912* (2013.01); *C08F 4/65916* (2013.01); *C08G 2650/34* (2013.01)

(58) Field of Classification Search
CPC .... C08F 4/02; C08F 4/65912; C08F 4/65916; C08F 4/6592; C08F 10/00; C08F 4/6494
See application file for complete search history.

(56) References Cited

U.S. PATENT DOCUMENTS

| | | | |
|---|---|---|---|
| 5,552,358 A | 9/1996 | Speca | |
| 8,273,677 B2 * | 9/2012 | Ogane | ........................... 502/109 |
| 2009/0306314 A1 | 12/2009 | Hamba et al. | |
| 2010/0029877 A1 | 2/2010 | Funaya et al. | |
| 2011/0136994 A1 | 6/2011 | Ochi et al. | |

FOREIGN PATENT DOCUMENTS

| | | |
|---|---|---|
| CN | 101558089 A | 10/2009 |
| CN | 101878233 A | 11/2010 |
| EP | 2096126 A1 | 9/2009 |
| JP | H09-157320 A | 6/1997 |
| JP | H10-330413 A | 12/1998 |
| JP | 2000-327707 A | 11/2000 |
| JP | 2004059828 A | 2/2004 |
| JP | 2004-262992 A | 9/2004 |
| WO | 2012118233 A1 | 9/2012 |

OTHER PUBLICATIONS

Office Action issued Mar. 2, 2015 in CN Application No. 201280060373.7.
Int'l Search Report issued Mar. 21, 2013 in Int'l Application No. PCT/JP2012/082273.
Int'l Preliminary Report on Patentability issued Jun. 10, 2014 in Int'l Application No. PCT/JP2012/082273.
Office Action issued Sep. 8, 2015 in CN Application No. 201280060373.7.

* cited by examiner

*Primary Examiner* — Caixia Lu
(74) *Attorney, Agent, or Firm* — Panitch Schwarze Belisario & Nadel LLP

(57) ABSTRACT

An object of the present invention is to provide a method which can simply suppress fouling in a reactor and, according to the present invention, there is provided a method of polymerizing addition polymerizable monomers using a catalyst formed by bringing (A) a transition metal compound represented by the following general formula [3] or μ-oxo type transition metal compound dimer thereof and (B) an activating agent into contact with one another, the method comprising polymerizing addition polymerizable monomers in a solvent to which a surfactant-containing particle obtained by mixing a particle composed of an inorganic compound or an organic polymer, and at least one surfactant selected from the group consisting of a compound represented by the following general formula [1] and a compound represented by general formula [2] has been added.

$R^1-O-(-R^2-O-)_m-Q^1$      [1]

$R^1{}'C(=O)NR^5{}_2$      [2]

$L^1{}_aM^2X^1{}_b$      [3].

11 Claims, No Drawings

POLYMERIZATION METHOD USING SURFACTANT-CONTAINING PARTICLE

CROSS-REFERENCE TO RELATED APPLICATION

This application is a Section 371 of International Application No. PCT/JP2012/082273, filed Dec. 6, 2012, which was published in the English language on Jun. 13, 2013, under International Publication No. WO 2013/085074 A1, and the disclosure of which is incorporated herein by reference.

TECHNICAL FIELD

The present invention relates to a polymerization method using a surfactant-containing particle.

BACKGROUND ART

When a chemical reaction is performed in a reactor, fouling phenomenon that a reaction product is adhered to a wall surface of the reactor occurs in some cases. When fouling is generated, it becomes difficult to remove heat from a reactor wall surface, and thus it becomes difficult to control a reaction temperature, and as the most severe situation, a runaway reaction is caused in some cases. And, once fouling has occurred, it is difficult to remove fouling while an operation is continued, and therefore it is necessary to open the reactor and clean it, and a reduction in productivity is caused in some cases.

Fouling becomes a remarkable problem, particularly, in a polymerization reaction. In order to suppress fouling in a polymerization reaction, a method of adding a specific surfactant to a reaction system is known (Patent Document 1, Patent Document 2).

Since many of surfactants have a pour point around room temperature, and exhibit a nature of a paste state or a liquid state in which a part is precipitated in many cases, pipe clogging is caused in some cases, when a surfactant having deteriorated flowability is added to a reactor through the pipe as it is.

And, since the surfactant has a hydrophilic group, it has hygroscopy, and among commercially available surfactants, many of them are sold in the state where water is contained. When water prevents progression of a chemical reaction, it is necessary to remove water in the surfactant before addition to a reaction system. Patent Document 2 describes a dehydration method by nitrogen bubbling, but there is a disadvantage that since the surfactant generally has foamability, the surfactant becomes to have a foamy nature due to bubbling, and addition to the reaction system thereafter becomes difficult.

Further, since solubility of the surfactant sensitively responds to a temperature, it is preferable to provide an apparatus for temperature regulation in a storage tank or a supply line, in order to handle the surfactant in the state of a uniform solution. Patent Document 2 describes a method of adding, to a reactor, the surfactant as a hexane solution, a temperature of which is regulated at 50° C. However, since in a facility not having these apparatuses, a special facility for temperature regulation becomes necessary, this results in disadvantage from a view point of the cost.

CITATION LIST

Patent Document

Patent Document 1: JP 2000-327707 A
Patent Document 2: JP 2004-262992 A

SUMMARY OF THE INVENTION

Under such the circumstances, a problem to be solved by the present invention is to provide a method which can simply suppress fouling in a reactor.

The first aspect of the present invention relates to a method of polymerizing addition polymerizable monomers using a catalyst formed by bringing (A) a transition metal compound represented by the following general formula [3] or a μ-oxo type transition metal compound dimer thereof, and (B) an activating agent into contact with one another, comprising polymerizing addition polymerizable monomers in a solvent to which a surfactant-containing particle obtained by mixing a particle composed of an inorganic compound or an organic polymer, and at least one surfactant selected from the group consisting of a compound represented by the following general formula [1] and a compound represented by general formula [2] has been added,

$$R^1-O-(-R^2-O-)_m-Q^1 \qquad [1]$$

$$R^{1'}C(=O)NR^5_2 \qquad [2]$$

wherein, in the general formulas [1] and [2], $R^1$ and $R^{1'}$ represent a hydrocarbyl group having 1 to 30 carbon atoms and optionally having a substituent, $R^2$ represents an alkylene group having 1 to 20 carbon atoms and optionally having a substituent, m represents a number of 1 to 100, when there are more than one $R^2$, they may be the same or different from each other, $Q^1$ represents a hydrogen atom, $-C(=O)OM^1$, $-R^3-C(=O)OM^1$, $-S(=O)_2OM^1$, $-R^3-S(=O)_2M^1$, $-P(=O)(OH)(OM^1)$, $-R^3-P(=O)(OH)(OM^1)$, $-P(=O)(OR^4)(OM^1)$, $-R-P(=O)(OR^4)(OM^1)$, $-P(=O)(OM^1)_2$, or $-R^3-P(=O)(OM^1)_2$, $M^1$ represents a hydrogen atom, $NH_4$, $NH(R^{12}OH)_3$ or an alkali metal atom, when there are more than one $M^1$, they may be the same or different from each other, $R^3$ represents an alkylene group having 1 to 20 carbon atoms and optionally having a substituent, $R^4$ represents a hydrocarbyl group having 1 to 20 carbon atoms and optionally having a substituent, $R^{12}$ represents an alkylene group having 1 to 20 carbon atoms and optionally having a substituent. $R^{12}$ groups may be the same or different from each other, $R^5$ represents a hydrogen atom, or a hydrocarbyl group having 1 to 30 carbon atoms and optionally having a substituent, $R^5$ groups may be the same or different from each other,

$$L^1_a M^2 X^1_b \qquad [3]$$

wherein $M^2$ is a transition metal atom of Group 4 of the Periodic Table, $L^1$ is a group having a cyclopentadienide frame or a group containing a hetero atom, when there are more than one $L^1$, one $L^1$ may be linked to another $L^1$ either directly or via a residue containing a carbon atom, a silicon atom, a nitrogen atom, an oxygen atom, a sulfur atom or a phosphorus atom, $X^1$ is a halogen atom, a hydrocarbyl group other than groups having a cyclopentadienide frame, or a hydrocarbyloxy group, and, a represents a number satisfying 0<a≤3, and b represents a number satisfying 0<b≤3.

The second aspect of the present invention relates to a method of polymerizing addition polymerizable monomers using a catalyst formed by bringing (A) a transition metal compound represented by the following general formula [3] or a μ-oxo type transition metal compound dimer thereof, (B) an activating agent and (C) an organoaluminum compound into contact with one another, comprising polymerizing addition polymerizable monomers in a solvent to which a surfactant-containing particle obtained by mixing a particle composed of an inorganic compound or an organic polymer, and at least one surfactant selected from the group consisting of a compound represented by the following general formula [1] and a compound represented by the general formula [2] has been added, $$R^1-O-(-R^2-O-)_m-Q^1 \quad [1]$$

$$R^{1'}C(=O)NR^5_2 \quad [2]$$

wherein, in the general formulas [1] and [2], $R^1$ and $R^{1'}$ represent a hydrocarbyl group having 1 to 30 carbon atoms and optionally having a substituent, $R^2$ represents an alkylene group having 1 to 20 carbon atoms and optionally having a substituent, m represents a number of 1 to 100, when there are more than one $R^2$, they may be the same or different from each other, $Q^1$ represents a hydrogen atom, $-C(=O)OM^1$, $-R^3-C(=O)OM^1$, $-S(=O)_2OM^1$, $-R-S(=O)_2OM^1$, $-P(=O)(OH)(OM^1)$, $-R^3-P(=O)(OH)(OM^1)$, $-P(=O)(OR^4)(OM^1)$, $-R^3-P(=O)(OR^4)(OM^1)$, $-P(=O)(OM^1)_2$, or $-R^3-P(=O)(OM^1)_2$, $M^1$ represents a hydrogen atom, $NH_4$, $NH(R^{12}OH)_3$ or an alkali metal atom, when there are more than one MI, they may be the same or different from each other, $R^3$ represents an alkylene group having 1 to 20 carbon atoms and optionally having a substituent, $R^4$ represents a hydrocarbyl group having 1 to 20 carbon atoms and optionally having a substituent, $R^{12}$ represents an alkylene group having 1 to 20 carbon atoms and optionally having a substituent, $R^{12}$ groups may be the same or different from each other, $R^5$ represents a hydrogen atom, or a hydrocarbyl group having 1 to 30 carbon atoms and optionally having a substituent, $R^5$ groups may be the same or different from each other, $$L^1_a M^2 X^1_b \quad [3]$$

wherein $M^2$ is a transition metal atom of Group 4 of the Periodic Table, $L^1$ is a group having a cyclopentadienide frame or a group having a hetero atom, when there are more than one $L^1$, one $L^1$ may be linked to another $L^1$ either directly or via a residue containing a carbon atom, a silicon atom, a nitrogen atom, an oxygen atom, a sulfur atom or a phosphorus atom, $X^1$ is a halogen atom, a hydrocarbyl group other than groups having a cyclopentadienide frame, or a hydrocarbyloxy group, and, a represents a number satisfying 0<a≤3, and b represents a number satisfying 0<b≤3.

According to the method of the present invention, even when a polymerization reaction is continuously performed in the reactor, it becomes possible to prevent a reduction in a heat transmission efficacy of a polymerization reactor due to fouling, and stably perform a continuous operation.

DESCRIPTION OF EMBODIMENTS

The present invention will be explained in detail below.
Surfactant-Containing Particle
A surfactant-containing particle is obtained by mixing a surfactant and a particle. The surfactant is at least one compound selected from the group consisting of a compound represented by the following general formula [1] and a compound represented by the general formula [2], $$R^1-O-(-R^2-O-)_m-Q^1 \quad [1]$$

$$R^{1'}C(=O)NR^5_2 \quad [2]$$

wherein, in the general formulas [1] and [2], $R^1$ and $R^{1'}$ represent a hydrocarbyl group having 1 to 30 carbon atoms and optionally having a substituent, $R^2$ represents an alkylene group having 1 to 20 carbon atoms and optionally having a substituent. And, m represents a number of 1 to 100, when there are more than one $R^2$, they may be the same or different from each other, $Q^1$ represents a hydrogen atom, $-C(=O)OM^1$, $-R^3-C(=O)OM^1$, $-S(=O)_2OM^1$, $-R^3-S(=O)_2OM^1$, $-P(=O)(OH)(OM^1)$, $-R^3-P(=O)(OH)(OM^1)$, $-P(=O)(OR^4)(OM^1)$, $-R-P(=O)(OR^4)(OM^1)$, $-P(=O)(OM^1)_2$, or $-R^3-P(=O)(OM^1)_2$, $M^1$ represents a hydrogen atom, $NH_4$, $NH(R^{12}OH)_3$ or an alkali metal atom, when there are more than one $M^1$, they may be the same or different from each other, $R^3$ represents an alkylene group having 1 to 20 carbon atoms and optionally having a substituent, $R^4$ represents a hydrocarbyl group having 1 to 20 carbon atoms and optionally having a substituent, $R^{12}$ represents an alkylene group having 1 to 20 carbon atoms and optionally having a substituent, $R^{12}$ groups may be the same or different from each other, $R^5$ represents a hydrogen atom, or a hydrocarbyl group having 1 to 30 carbon atoms and optionally having a substituent, $R^5$ groups may be the same or different from each other.

Examples of the hydrocarbyl group having 1 to 30 carbon atoms and optionally having a substituent of $R^1$ of the formula [1] include an alkyl group having 1 to 30 carbon atoms and optionally having a substituent, an aralkyl group having 7 to 30 carbon atoms and optionally having a substituent, and an aryl group having 6 to 30 carbon atoms and optionally having a substituent and the like.

Examples of the alkyl group having 1 to 30 carbon atoms and optionally having a substituent of $R^1$ include an alkyl group having 1 to 30 carbon atoms, an alkyl group having 1 to 30 carbon atoms having a halogen atom as a substituent, an alkyl group having 1 to 30 carbon atoms having a substituted silyl group as a substituent, an alkyl group having 1 to 30 carbon atoms having a substituted amino group as a substituent, an alkyl group having 1 to 30 carbon atoms having a hydroxy group as a substituent, and an alkyl group having 1 to 30 carbon atoms having a hydrocarbyloxy group as a substituent and the like.

Examples of the alkyl group having 1 to 30 carbon atoms of $R^1$ include methyl, ethyl, n-propyl, isopropyl, n-butyl, sec-butyl, tert-butyl, n-pentyl, neopentyl, isopentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, n-tricosyl, n-tetracosyl, n-pentacosyl, n-hexacosyl, n-heptacosyl, n-octacosyl, n-nonacosyl, n-triacontyl groups, etc.

Examples of the alkyl group having 1 to 30 carbon atoms having a halogen atom as substituents of $R^1$ include fluoromethyl, difluoromethyl, trifluoromethyl, chloromethyl, dichloromethyl, trichloromethyl, bromomethyl, dibromomethyl, tribromomethyl, iodomethyl, diiodomethyl, triiodomethyl, fluoroethyl, difluoroethyl, trifluoroethyl, tetrafluoroethyl, pentafluoroethyl, chloroethyl, dichloroethyl, trichloroethyl, tetrachloroethyl, pentachloroethyl, bromoethyl, dibromoethyl, tribromoethyl, tetrabromoethyl, pentabromoethyl, perfluoropropyl, perfluorobutyl, perfluoropentyl, perfluorohexyl, perfluorooctyl, perfluorododecyl, perfluoropentadecyl, perfluoroeicosyl, perfluorotriacontyl, perchloropropyl, perchlorobutyl, perchloropentyl, perchlorohexyl, perchlorooctyl, perchlorododecyl, perchloropentadecyl, perchloroeicosyl, perchlorotriacontyl, perbromopropyl, perbromobutyl, perbromopentyl, perbromohexyl, perbromooctyl, perbromododecyl, perbromopentadecyl, perbromoeicosyl, perbromotriacontyl groups, etc.

Examples of the alkyl group having 1 to 30 carbon atoms having a substituted silyl group as a substituent of $R^1$ include trimethylsilylmethyl, trimethylsilylethyl, trimethylsilylpropyl, trimethylsilylbutyl, bis(trimethylsilyl)methyl, bis(trimethylsilyl)ethyl, bis(trimethylsilyl)propyl, bis(trimethylsilyl) butyl, triphenylsilylmethyl groups, etc.

Examples of the alkyl group having 1 to 30 carbon atoms having a substituted amino group as a substituent of $R^1$ include dimethylaminomethyl, dimethylaminoethyl, dimethylaminopropyl, dimethylaminobutyl, bis(dimethylamino) methyl, bis(dimethylamino)ethyl, bis(dimethylamino)propyl, bis(dimethylamino)butyl, phenylaminomethyl, diphenylaminomethyl groups, etc.

Examples of the alkyl group having 1 to 30 carbon atoms having a hydroxy group as a substituent of $R^1$ include hydroxymethyl, dihydroxymethyl, trihydroxymethyl, 1-hydroxyethyl, 2-hydroxyethyl, 1-hydroxy-n-propyl, 2-hydroxy-n-propyl, 3-hydroxy-n-propyl, 1-hydroxyisopropyl, 2-hydroxyisopropyl groups, etc.

Examples of the alkyl group having 1 to 30 carbon atoms having a hydrocarbyloxy group as a substituent of $R^1$ include methoxymethyl, ethoxymethyl, n-propoxymethyl, isopropoxymethyl, n-butoxymethyl, sec-butoxymethyl, tert-butoxymethyl, phenoxymethyl, methoxyethyl, ethoxyethyl, n-propoxyethyl, isopropoxyethyl, n-butoxyethyl, sec-butoxyethyl, tert-butoxyethyl, phenoxyethyl, methoxy-n-propyl, ethoxy-n-propyl, n-propoxy-n-propyl, isopropoxy-n-propyl, n-butoxy-n-propyl, sec-butoxy-n-propyl, tert-butoxy-n-propyl, phenoxy-n-propyl, methoxyisopropyl, ethoxyisopropyl, n-propoxyisopropyl, isopropoxyisopropyl, n-butoxyisopropyl, sec-butoxyisopropyl, tert-butoxyisopropyl, phenoxyisopropyl groups, etc.

Examples of the aralkyl group having 7 to 30 carbon atoms and optionally having a substituent of $R^1$ include an aralkyl group having 7 to 30 carbon atoms, an aralkyl group having 7 to 30 carbon atoms having a halogen atom as a substituent and the like.

Examples of the aralkyl group having 7 to 30 carbon atoms of $R^1$ include benzyl, (2-methylphenyl)methyl, (3-methylphenyl)methyl, (4-methylphenyl)methyl, (2,3-dimethylphenyl)methyl, (2,4-dimethylphenyl)methyl, (2,5-dimethylphenyl)methyl, (2,6-dimethylphenyl)methyl, (3,4-dimethylphenyl)methyl, (4,6-dimethylphenyl)methyl, (2,3,4-trimethylphenyl)methyl, (2,3,5-trimethylphenyl)methyl, (2,3,6-trimethylphenyl)methyl, (3,4,5-trimethylphenyl)methyl, (2,4,6-trimethylphenyl)methyl, (2,3,4,5-tetramethylphenyl)methyl, (2,3,4,6-tetramethylphenyl)methyl, (2,3,5,6-tetramethylphenyl)methyl, (pentamethylphenyl)methyl, (ethylphenyl)methyl, (n-propylphenyl)methyl, (isopropylphenyl)methyl, (n-butylphenyl)methyl, (sec-butylphenyl) methyl, (tert-butylphenyl)methyl, (n-pentylphenyl)methyl, (neopentylphenyl)methyl, (n-hexylphenyl)methyl, (n-octylphenyl)methyl, (n-decylphenyl)methyl, (n-decylphenyl) methyl, (n-tetradecylphenyl)methyl, naphthylmethyl, anthracenylmethyl, phenylethyl, phenylpropyl, phenylbutyl, diphenylmethyl, diphenylethyl, diphenylpropyl, diphenylbutyl groups, etc.

Examples of the aralkyl group having 7 to 30 carbon atoms having a halogen atom as a substituent of $R^1$ include 2-fluorobenzyl, 3-fluorobenzyl, 4-fluorobenzyl, 2-chlorobenzyl, 3-chlorobenzyl, 4-chlorobenzyl, 2-bromobenzyl, 3-bromobenzyl, 4-bromobenzyl, 2-iodobenzyl, 3-iodobenzyl, 4-iodobenzyl groups, etc.

Examples of the aryl group having 6 to 30 carbon atoms and optionally having a substituent of $R^1$ include an aryl group having 6 to 30 carbon atoms, an aryl group having 6 to 30 carbon atoms having a halogen atom as a substituent, an aryl group having 6 to 30 carbon atoms having a substituted silyl group as a substituent, an aryl group having 6 to 30 carbon atoms having a substituted amino group as a substituent, an aryl group having 6 to 30 carbon atoms having a hydrocarbyloxy group as a substituent and the like.

Examples of the aryl group having 6 to 30 carbon atoms of $R^1$ include phenyl, 2-tolyl, 3-tolyl, 4-tolyl, 2,3-xylyl, 2,4-xylyl, 2,5-xylyl, 2,6-xylyl, 3,4-xylyl, 3,5-xylyl, 2,3,4-trimethylphenyl, 2,3,5-trimethylphenyl, 2,3,6-trimethylphenyl, 2,4,6-trimethylphenyl, 3,4,5-trimethylphenyl, 2,3,4,5-tetramethylphenyl, 2,3,4,6-tetramethylphenyl, 2,3,5,6-tetramethylphenyl, pentamethylphenyl, ethylphenyl, diethylphenyl, triethylphenyl, n-propylphenyl, isopropylphenyl, n-butylphenyl, sec-butylphenyl, tert-butylphenyl, n-pentylphenyl, neopentylphenyl, n-hexylphenyl, n-octylphenyl, n-decylphenyl, n-dodecylphenyl, n-tetradecylphenyl, naphthyl, anthracenyl groups, etc.

Examples of the aryl group having 6 to 30 carbon atoms having a halogen atom as a substituent of $R^1$ include 2-fluorophenyl, 3-fluorophenyl, 4-fluorophenyl, 2-chlorophenyl, 3-chlorophenyl, 4-chlorophenyl, 2-bromophenyl, 3-bromophenyl, 4-bromophenyl, 2-iodophenyl, 3-iodophenyl, 4-iodophenyl groups, etc.

Examples of the aryl group having 6 to 30 carbon atoms having a substituted silyl group as a substituent of $R^1$ include a trimethylsilylphenyl group, a bis(trimethylsilyl)phenyl group and the like.

Examples of the aryl group having 6 to 30 carbon atoms having a substituted amino group as a substituent of $R^1$ include a dimethylaminophenyl group, a bis(dimethylamino) phenyl group, a diphenylaminophenyl group and the like.

Examples of the aryl group having 6 to 30 carbon atoms having a hydrocarbyloxy group as a substituent of $R^1$ include a methoxyphenyl group, an ethoxyphenyl group, a n-propoxyphenyl group, an isopropoxyphenyl group, a n-butoxyphenyl group, a sec-butoxyphenyl group, a tert-butoxyphenyl group, a phenoxyphenyl group and the like.

$R^1$ in the formula [1] is preferably an alkyl group having 1 to 30 carbon atoms and optionally having a substituent, and more preferably an alkyl group having 1 to 30 carbon atoms.

$R^2$ represents an alkylene group having 1 to 20 carbon atoms and optionally having a substituent.

Examples of the alkylene group having 1 to 20 carbon atoms and optionally having a substituent of $R^2$ include an alkylene group having 1 to 20 carbon atoms, an alkylene group having 1 to 20 carbon atoms having a halogen atom as a substituent, an alkylene group having 1 to 20 carbon atoms having a substituted silyl group as a substituent, an alkylene group having 1 to 20 carbon atoms having a substituted amino group as a substituent, an alkylene group having 1 to 20 carbon atoms having a hydrocarbyloxy group as a substituent and the like.

Examples of the alkylene group having 1 to 20 carbon atoms of $R^2$ include methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, eicosylene, methylmethylene, dimethylmethylene, ethylmethylene, ethylmethylmethylene, diethylmethylene, propylenemethylene, methylethylene, dimethylethylene, atrimethylethylene, tetramethylethylene groups, etc.

Examples of the alkylene group having 1 to 20 carbon atoms having a halogen atom as a substituent of $R^2$ include fluoromethylene, difluoromethylene, chloromethylene, dichloromethylene, bromomethylene, dibromomethylene, iodomethylene, diiodomethylene, fluoroethylene, difluoroethylene, trifluoroethylene, tetrafluoroethylene, chloroethylene, dichloroethylene, trichloroethylene, tetrachloroethylene, bromoethylene, dibromoethylene, tribromoethylene, tetrabromoethylene, perfluoropropylene, perfluorobutylene, perfluoropentylene, perfluorohexylene, perfluorooctylene, perfluorododecylene, perfluoropentadecylene, perfluoroeicosylene, perchloropropylene, perchlorobutylene, perchloropentylene, perchlorohexylene, perchlorooctylene, perchlorododecylene, perchloropentadecylene, perchloroeicosylene, perbromopropylene, perbromobutylene, perbromopentylene, perbromohexylene, perbromooctylene, perbromododecylene, perbromopentadecylene, perbromoeicosylene groups, etc.

Examples of the alkylene group having 1 to 20 carbon atoms having a substituted silyl group as a substituent group of $R^2$ include trimethylsilylmethylene, trimethylsilylethylene, trimethylsilylpropylene, trimethylsilylbutylene, bis(trimethylsilyl)methylene, bis(trimethylsilyl)ethylene, bis(trimethylsilyl)propylene, bis(trimethylsilyl)butylene, triphenylsilylmethyl groups, etc.

Examples of the alkylene group having 1 to 20 carbon atoms having a substituted amino group as a substituent group of $R^2$ include dimethylaminomethylene, dimethylaminoethylene, dimethylaminopropylene, dimethylaminobutylene, bis(dimethylamino)methylene, bis(dimethylamino)ethylene, bis(dimethylamino)propylene, bis(dimethylamino)butylene, phenylaminomethylene, diphenylaminomethylene groups, etc.

Examples of the alkylene group having 1 to 20 carbon atoms having hydrocarbyloxy group as a substituent group of $R^2$ include methoxymethylene, ethoxymethylene, n-propoxymethylene, isopropoxymethylene, n-butoxymethylene, sec-butoxymethylene, tert-butoxymethylene, phenoxymethylene, methoxyethylene, ethoxyethylene, n-propoxyethylene, isopropoxyethylene, n-butoxyethylene, sec-butoxyethylene, tert-butoxyethylene, phenoxyethylene, methoxy-n-propylene, ethoxy-n-propylene, n-propoxy-n-propylene, isopropoxy-n-propylene, n-butoxy-n-propylene, sec-butoxy-n-propylene, tert-butoxy-n-propylene, phenoxy-n-propylene, methoxyisopropylene, ethoxyisopropylene, n-propoxyisopropylene, isopropoxyisopropylene, n-butoxyisopropylene, sec-butoxyisopropylene, tert-butoxyisopropylene, phenoxyisopropylene groups, etc.

The alkylene group having 1 to 20 carbon atoms is preferable for $R^2$ in the above-mentioned formula [1]; methylene, ethylene, propylene, butylene, pentylene, and hexylene groups are more preferable; and ethylene group is even more preferable.

$Q^1$ represents a hydrogen atom, —C(=O)OM$^1$, —R$^3$—C(=O)OM$^1$, —S(=O)$_2$OM$^1$, —R$^3$—S(=O)$_2$OM$^1$, —P(=O)(OH)(OM$^1$), —R$^3$—P(=O)(OH)(OM$^1$), —P(=O)(OR$^4$)(OM$^1$), —R$^3$—P(=O)(OR$^4$)(OM$^1$), —P(=O)(OM$^1$)$_2$, or —R$^3$—P(=O)(OM$^1$)$_2$; and preferably a hydrogen atom, —R$^3$—C(=O)OM$^1$, or —S(=O)$_2$OM$^1$.

In the above exemplification, $M^1$ represents a hydrogen atom, NH$_4$, NH(R$^{12}$OH)$_3$ or an alkali metal atom, preferably an alkali metal atom.

The alkali metal atom of $M^1$ is preferably a sodium atom or a potassium atom, and more preferably a sodium atom.

$R^{12}$ represents an alkylene group having 1 to 20 carbon atoms and optionally having a substituent.

Examples of the alkylene group having 1 to 20 carbon atoms and optionally having a substituent of $R^{12}$ include the same groups as the groups described in $R^2$.

$R^{12}$ is preferably an alkylene group having 1 to 20 carbon atoms, more preferably a methylene group, an ethylene group, a propylene group, a butylene group, a pentylene group, or a hexylene group, and further preferably an ethylene group.

$R^3$ represents an alkylene group having 1 to 20 carbon atoms and optionally having a substituent.

Examples of the alkylene group having 1 to 20 carbon atoms and optionally having a substituent of $R^3$ include the same groups as the groups described in $R^2$.

$R^3$ is preferably an alkylene group having 1 to 20 carbon atoms, and more preferably a methylene group, an ethylene group, a propylene group, a butylene group, a pentylene group or a hexylene group, and further preferably a methylene group.

$R^4$ represents a hydrocarbyl group having 1 to 20 carbon atoms and optionally having a substituent.

Examples of the hydrocarbyl group having 1 to 20 carbon atoms and optionally having a substituent of $R^4$ include an alkyl group having 1 to 20 carbon atoms and optionally having a substituent, an aralkyl group having 7 to 20 carbon atoms and optionally having a substituent, an aryl group having 6 to 20 carbon atoms and optionally having a substituent and the like.

Examples of the alkyl group having 1 to 20 carbon atoms and optionally having a substituent of $R^4$ include an alkyl group having 1 to 20 carbon atoms, an alkyl group having 1 to 20 carbon atoms having a halogen atom as a substituent, an alkyl group having 1 to 20 carbon atoms having a substituted silyl group as a substituent, an alkyl group having 1 to 20 carbon atoms having a substituted amino group as a substituent, an alkyl group having 1 to 20 carbon atoms having a hydrocarbyloxy group as a substituent and the like.

Examples of the alkyl group having 1 to 20 carbon atoms of $R^4$ include methyl, ethyl, n-propyl, isopropyl, n-butyl, sec-butyl, tert-butyl, n-pentyl, neopentyl, isopentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl groups, etc.

Examples of the alkyl group having 1 to 20 carbon atoms having a halogen atom as a substituent of $R^4$ include fluoromethyl, difluoromethyl, trifluoromethyl, chloromethyl, dichloromethyl, trichloromethyl, bromomethyl, dibromomethyl, tribromomethyl, iodomethyl, diiodomethyl, triiodomethyl, fluoroethyl, difluoroethyl, trifluoroethyl, tetrafluoroethyl, pentafluoroethyl, chloroethyl, dichloroethyl, trichloroethyl, tetrachloroethyl, pentachloroethyl, bromoethyl, dibromoethyl, tribromoethyl, tetrabromoethyl, pentabromoethyl, perfluoropropyl, perfluorobutyl, perfluoropentyl, perfluorohexyl, perfluorooctyl, perfluorododecyl, perfluoropentadecyl, perfluoroeicosyl, perchloropropyl, perchlorobutyl, perchloropentyl, perchlorohexyl, perchlorooctyl, perchlorododecyl, perchloropentadecyl, perchloroeicosyl, perbromopropyl, perbromobutyl, perbromopentyl, perbromohexyl, perbromooctyl, perbromododecyl, perbromopentadecyl, perbromoeicosyl groups, etc.

Examples of the alkyl group having 1 to 20 carbon atoms having substituted silyl group as a substituent of $R^4$ include trimethylsilylmethyl, trimethylsilylethyl, trimethylsilylpropyl, trimethylsilylbutyl, bis(trimethylsilyl)methyl, bis(trimethylsilyl)ethyl, bis(trimethylsilyl)propyl, bis(trimethylsilyl)butyl, triphenylsilylmethyl groups, etc.

Examples of the alkyl group having 1 to 20 carbon atoms having substituted amino group as a substituent of $R^4$ include dimethylaminomethyl, dimethylaminoethyl, dimethylaminopropyl, dimethylaminobutyl, bis(dimethylamino)methyl, bis(dimethylamino)ethyl, bis(dimethylamino)propyl, bis(dimethylamino)butyl, phenylaminomethyl, diphenylaminomethyl groups, etc.

Examples of the alkyl group having 1 to 20 carbon atoms having hydrocarbyloxy group as a substituent of $R^4$ include methoxymethyl, ethoxymethyl, n-propoxymethyl, isopropoxymethyl, n-butoxymethyl, sec-butoxymethyl, tert-butoxymethyl, phenoxymethyl, methoxyethyl, ethoxyethyl, n-propoxyethyl, isopropoxyethyl, n-butoxyethyl, sec-butoxyethyl, tert-butoxyethyl, phenoxyethyl, methoxy-n-propyl, ethoxy-n-propyl, n-propoxy-n-propyl, isopropoxy-n-propyl, n-butoxy-n-propyl, sec-butoxy-n-propyl, tert-butoxy-n-propyl, phenoxy-n-propyl, methoxyisopropyl, ethoxyisopropyl, n-propoxyisopropyl, isopropoxyisopropyl, n-butoxyisopropyl, sec-butoxyisopropyl, tert-butoxyisopropyl, phenoxyisopropyl groups, etc.

Examples of the aralkyl group having 7 to 20 carbon atoms and optionally having a substituent of $R^4$ include an aralkyl group having 7 to 20 carbon atoms, an aralkyl group having 7 to 20 carbon atoms having a halogen atom as a substituent and the like.

Examples of the aralkyl group having 7 to 20 carbon atoms of $R^4$ include benzyl, (2-methylphenyl)methyl, (3-methylphenyl)methyl, (4-methylphenyl)methyl, (2,3-dimethylphenyl)methyl, (2,4-dimethylphenyl)methyl, (2,5-dimethylphenyl)methyl, (2,6-dimethylphenyl)methyl, (3,4-dimethylphenylmethyl, (4,6-dimethylphenyl)methyl, (2,3,4-trimethylphenyl)methyl, (2,3,5-trimethylphenylmethyl, (2,3,6-trimethylphenyl)methyl, (3,4,5-trimethylphenyl)methyl, (2,4,6-trimethylphenyl)methyl, (2,3,4,5-tetramethylphenyl) methyl, (2,3,4,6-tetramethylphenyl)methyl, (2,3,5,6-tetramethylphenyl)methyl, (pentamethylphenyl)methyl, (ethylphenyl)methyl, (n-propylphenyl)methyl, (isopropylphenyl) methyl, (n-butylphenyl)methyl, (sec-butylphenyl)methyl, (tert-butylphenyl)methyl, (n-pentylphenyl)methyl, (neopentylphenyl)methyl, (n-hexylphenyl)methyl, (n-octylphenyl) methyl, (n-decylphenyl)methyl, (n-decylphenyl)methyl, (n-tetradecylphenyl)methyl, naphthylmethyl, anthracenylmethyl, phenylethyl, phenylpropyl, phenylbutyl, diphenylmethyl, diphenylethyl, diphenylpropyl, diphenylbutyl groups, etc.

Examples of the aralkyl group having 7 to 20 carbon atoms having a halogen atom as a substituent of $R^4$ include 2-fluorobenzyl, 3-fluorobenzyl, 4-fluorobenzyl, 2-chlorobenzyl, 3-chlorobenzyl, 4-chlorobenzyl, 2-bromobenzyl, 3-bromobenzyl, 4-bromobenzyl, 2-iodobenzyl, 3-iodobenzyl, 4-iodobenzyl groups, etc.

Examples of the aryl group having 6 to 20 carbon atoms and optionally having a substituent of $R^4$ include an aryl group having 6 to 20 carbon atoms, an aryl group having 6 to 20 carbon atoms having a halogen atom as a substituent and the like.

Examples of the aryl group having 6 to 20 carbon atoms of $R^4$ include phenyl, 2-tolyl, 3-tolyl, 4-tolyl, 2,3-xylyl, 2,4-xylyl, 2,5-xylyl, 2,6-xylyl, 3,4-xylyl, 3,5-xylyl, 2,3,4-trimethylphenyl, 2,3,5-trimethylphenyl, 2,3,6-trimethylphenyl, 2,4,6-trimethylphenyl, 3,4,5-trimethylphenyl, 2,3,4,5-tetramethylphenyl, 2,3,4,6-tetramethylphenyl, 2,3,5,6-tetramethylphenyl, pentamethylphenyl, ethylphenyl, n-propylphenyl, isopropylphenyl, n-butylphenyl, sec-butylphenyl, tert-butylphenyl, n-pentylphenyl, neopentylphenyl, n-hexylphenyl, n-octylphenyl, n-decylphenyl, n-dodecylphenyl, n-tetradecylphenyl, naphthyl, and anthracenyl groups and the like.

Examples of the aryl group having 6 to 20 carbon atoms having a halogen atom as a substituent of $R^4$ include 2-fluorophenyl, 3-fluorophenyl, 4-fluorophenyl, 2-chlorophenyl, 3-chlorophenyl, 4-chlorophenyl, 2-bromophenyl, 3-bromophenyl, 4-bromophenyl, 2-iodophenyl, 3-iodophenyl, 4-iodophenyl groups, etc.

The alkyl group having 1 to 20 carbon atoms is preferable for $R^4$; the alkyl group having 1 to 5 carbon atoms is more preferable; and methyl, ethyl, n-propyl, and isopropyl groups are even more preferable.

And, m represents a number of 1 to 100.

And, m is preferably a number of 1 to 50, more preferably a number of 1 to 30, and further preferably a number of 1 to 12.

An example of $R^{1'}$ of the formula [2] includes the same hydrocarbyl group as the group explained as $R^1$ in the general formula [1].

$R^5$ of the formula [2] represents a hydrogen atom, or a hydrocarbyl group having 1 to 30 carbon atoms and optionally having a substituent.

As the hydrocarbyl group having 1 to 30 carbon atoms and optionally having a substituent in $R^5$, an alkyl group having 1 to 30 carbon atoms and optionally having a substituent, an aralkyl group having 7 to 30 carbon atoms and optionally having a substituent, and an aryl group having 6 to 30 carbon atoms and optionally having a substituent are preferable, and the same hydrocarbyl group as the group explained as $R^1$ in the general formula [1] is used.

Since polyethylene having a small fine powder content is obtained, as the surfactant, a compound represented by the general formula [1] is preferable.

As the compound [1], a surfactant in which $R^1$ is an alkyl group having 1 to 30 carbon atoms, $R^2$ is a methylene group, an ethylene group, a propylene group, a butylene group, a pentylene group or a hexylene group, $Q^1$ is a hydrogen atom, $—R^3—C(=O)OM^1$ or $—S(=O)_2OM^1$, and m is 1 to 12 is preferable, a surfactant in which $R^1$ is an alkyl group having 1 to 30 carbon atoms, $R^2$ is a methylene group, an ethylene group, a propylene group, a butylene group, a pentylene group, or a hexylene group, $Q^1$ is $—R^3—C(=O)OM^1$, and m is 1 to 12 is more preferable, and a surfactant in which $R^1$ is an alkyl group having 1 to 30 carbon atoms, $R^2$ is a methylene group, an ethylene group, a propylene group, a butylene group, a pentylene group or a hexylene group, $Q^1$ is $—R^3—C(=O)ONa$, or $—R^3—C(=O)OK$, and m is 1 to 12 is particularly preferable.

Examples of the compound [1] include polyoxyethylene lauryl ether, polyoxyethylene lauryl ether acetate, sodium polyoxyethylene lauryl ether acetate, potassium polyoxyethylene lauryl ether acetate, ammonium polyoxyethylene lauryl ether acetate, polyoxyethylene lauryl ether acetic acid triethanolamine, polyoxyethylene lauryl ether sulfuric acid, sodium polyoxyethylene lauryl ether sulfate, potassium polyoxyethylene lauryl ether sulfate, ammonium polyoxyethylene lauryl ether sulfate, polyoxyethylene lauryl ether sulfuric acid triethanolamine, polyoxyethylene lauryl ether phosphoric acid, sodium polyoxyethylene lauryl ether phosphate, potassium polyoxyethylene lauryl ether phosphate, ammonium polyoxyethylene lauryl ether phosphate, polyoxyethylene lauryl ether phosphoric acid triethanolamine, etc.

Preferable examples of the compound [1] may include polyoxyethylene lauryl ether, polyoxyethylene lauryl ether acetic acid, sodium polyoxyethylene lauryl ether acetate, polyoxyethylene lauryl ether sulfuric acid, and sodium polyoxyethylene lauryl ether sulfate; more preferable examples of the compound [1] include polyoxyethylene lauryl ether acetic acid and sodium polyoxyethylene lauryl ether acetate; and particularly preferable examples include sodium polyoxyethylene lauryl ether acetate.

Examples of the compound [2] include caprylic acid amide, caprylic acid diethanolamide, pelargonic acid amide, pelargonic acid diethanol amide, capric acid amide, capric acid diethanolamide, laurylic acid amide, laurylic acid diethanolamide, myristic acid amide, myristic acid diethanolamide, pentadecylic acid amide, pentadecylic acid diethanol amide, palmitic acid amide, palmitic acid diethanolamide, etc.

The compound [2] is preferably pelargonic acid diethanolamide, capric acid diethanolamide, lauric acid diethanolamide, or myristic acid diethanolamide.

The particle in the present invention is a particle composed of an inorganic compound or an organic polymer, and has a granule-like or fine particle-like shape.

Among them, examples of the inorganic compound include a porous oxide, inorganic chloride, a clay, a clay mineral or an ion-exchanging layered compound, and preferably a porous oxide or inorganic chloride described below.

Examples of the porous oxide include specifically $SiO_2$, $Al_2O_3$, MgO, ZrO, $TiO_2$, $B_2O_3$, CaO, ZnO, BaO and $ThO_s$, or a complex or a mixture containing them. And, for example, natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO and the like can be used. Among them, a porous oxide containing $SiO_2$ as a main component is preferable.

In addition, the porous oxide may contain a small amount of carbonate, sulfate, nitrate or an oxide component such as $Na_2CO_3$, $K_2CO$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$ and the like.

Examples of the inorganic chloride include $MgCl_2$, $MgBr_2$, $MnCl_2$, $MnBr_2$ and the like.

The clay used in the present invention is usually composed of a clay mineral as a main component. And, the ion-exchanging layered compound used in the present invention is a compound having a crystal structure in which planes constructed with an ion bond or the like are overlaid parallel to each other with a weak binding force, and ions contained are exchangeable. A majority of clay minerals are an ion-exchanging layered compound. And, as these clay, clay mineral and ion-exchanging layered compound, not only naturally occurring compounds, but also artificially synthesized compounds can be used.

Examples of such the clay and clay mineral include kaolin, bentonite, kibushi clay, gairome clay, allophane, hisingerite, pyrophyllite, mica group, montmorillonite group, vermiculite, chlorite group, palygorskite, kaolinite, nacrite, dickite, halloysite and the like, and examples of the ion-exchanging layered compound include multivalent metal crystalline acidic salts such as $\alpha$-$Zr(HAsO4)_2 \cdot H_2O$, $\alpha$-$Zr(HPO_4)_2$, $\alpha$-$Zr(KPO_4)_2 \cdot 3H_2O$, $\alpha$-$Ti(HPO_4)_2$, $\alpha$-$Ti(HAsO4)_2 \cdot H_2O$, $\alpha$-$Sn(HPO_4)_2 \cdot H_2O$, $\gamma$-$Zr(HPO_4)_2$, $\gamma$-$Ti(HPO_4)_2$, $\gamma Ti(NH_4PO_4)_2 \cdot H_2O$ and the like.

Among them, preferable is a clay or a clay mineral, and particularly preferable is montmorillonite, vermiculite, pectolite, taeniolite and synthetic mica.

As the organic polymer, a (co)polymer produced using, as a main component, an olefin having 2 to 14 carbon atoms such as ethylene, propylene, 1-butene, 4-methyl-1-pentene and the like or a (co)polymer produced using, as a main component, vinylcyclohexane or styrene, and a modified (co)polymer thereof can be exemplified. The organic polymer is preferably an ethylene/1-butene copolymer, an ethylene/1-hexene copolymer, or an ethylene/1-butene/1-hexene copolymer. One of the organic polymer may be used, or a mixture of the organic polymers may be used.

For making it easier to dry a surfactant containing water, a median diameter of the particle is usually 0.05 to 10 mm, preferably 0.1 to 5 mm, more preferably 0.5 to 3 mm, and further preferably 1.0 to 2.0 mm.

From a view point that a surfactant-containing particle excellent in flowability is obtained, a particle size distribution parameter (SPAN) of the particle is preferably 3 or less, more preferably 2.5 or less, further preferably 2.0 or less, and particularly preferably 1.8 or less. SPAN is expressed by the following equation, and a smaller value indicates that a particle size distribution is narrower.

$$\text{SPAN} = (d90 - d10)/d50$$

In the equation, d90, d10 or d50 is a particle size at 90%, 10% or 50% in a volume accumulation distribution, respectively. And, d50 corresponds to a median diameter.

A bulk density of the particle is not particularly limited, but since when a surfactant containing water is used, the surfactant is easily dried, the bulk density is usually 0.2 g/cm$^3$ or more, preferably 0.25 g/cm$^3$ or more, and more preferably 0.3 g/cm$^3$ or more.

A melting point (Tm) of the particle measured with a differential scanning calorimeter (DSC) is not particularly limited, but from a view point that a surfactant-containing particle excellent in flowability is obtained, the melting point is preferably 50° C. or higher. The melting point of the particle is more preferably 70° C. or higher, and further preferably 90° C. or higher.

A method of mixing a surfactant and a particle in order to obtain a surfactant-containing particle is not particularly limited, for example, the following methods can be used.

Method 1: A method of directly mixing a surfactant and a particle

Method 2: A method of mixing a surfactant diluted with a solvent, and a particle, and removing the solvent Method 3: A method of mixing a surfactant, and a particle dispersed in a solvent, and removing the solvent Method 4: A method of mixing a surfactant diluted with a solvent, and a particle dispersed in a solvent, and removing the solvent Examples of the solvent used in Method 2, Method 3 and Method 4 include a nonpolar solvent such as an aliphatic hydrocarbon solvent and an aromatic hydrocarbon solvent, and a polar solvent such as water, a halogenated solvent, an ether solvent, an alcohol solvent and the like.

The method of mixing a surfactant and a particle is preferably the Method 1 or the Method 2 described above.

The condition under which a surfactant and a particle are mixed is not particularly limited. A mixing temperature is preferably −50 to 200° C., more preferably −10 to 100° C., and particularly preferably 0 to 50° C. A mixing time is preferably 1 second to 1 hour, more preferably 30 seconds to 30 minutes, and particularly preferably 1 minute to 15 minutes, from a view point of prevention of crushing of the particle. Such mixing operation may be performed under vacuum, may be performed under the atmosphere, or may be performed under the inert gas atmosphere.

And, in order to remove a solvent in the surfactant-containing particle, it is preferable to dry the surfactant-containing particle after the mixing operation. Drying may be performed under vacuum, or may be performed under dry gas stream. A drying time is not particularly limited. It is preferable to perform drying for 1 hour or longer. A drying temperature is not particularly limited as far as it is a temperature lower than a melting point of the particle, and is preferably 20 to 80° C.

An amount of the surfactant in the surfactant-containing particle is preferably 1 to 1000 mmol/kg, more preferably 5 to 500 mmol/kg, and particularly preferably 10 to 100 mmol/kg.

The surfactant-containing particle can be used in a variety of chemical reactions. Preferable use is addition polymerization use. Specifically, a polymerization method of polymerizing addition polymerizable monomers in the presence of a catalyst for polymerization and a solvent, in which the addition polymerizable monomers are polymerized in a solvent to which the surfactant-containing particle has been added, is preferable.

(A) Transition metal compound or μ-oxo type transition metal compound dimer thereof The transition metal compound or μ-oxo type transition metal compound dimer thereof used in the present invention is a transition metal compound represented by the following formula [3] or a μ-oxo type transition metal compound dimer thereof, $$L^1{}_a M^2 X^1{}_b \qquad [3]$$

wherein $M^2$ is a transition metal atom of Group 4 of the Periodic Table, $L^1$ is a group having a cyclopentadienide frame or a group containing a hetero atom, when there are more than one $L^1$, one $L^1$ may be linked to another $L^1$ either directly or by a group containing a carbon atom, a silicon atom, a nitrogen atom, an oxygen atom, a sulfur atom or a phosphorus atom, $X^1$ is a halogen atom, a hydrocarbyl group other than groups having a cyclopentadienide frame, a hydrocarbyloxy group, and, a represents a number satisfying 0<a≤3, and b represents a number satisfying 0<b≤3.

$M^2$ in the formula [3] is a titanium atom, a zirconium atom or a hafnium atom, and more preferably a zirconium atom.

Examples of the group having a cyclopentadienide frame of $L^1$ in the formula [3] include (substituted)cyclopentadienyl, (substituted)indenyl, and (substituted)fluorenyl groups. Examples include cyclopentadienyl, methylcyclopentadienyl, ethylcyclopentadienyl, n-butylcyclopentadienyl, tert-butylcyclopentadienyl, 1,2-dimethylcyclopentadienyl, 1,3-dimethylcyclopentadienyl, 1-methyl-2-ethylcyclopentadienyl, 1-methyl-3=ethylcyclopentadienyl, 1-tert-butyl-2-methylcyclopentadienyl, 1-tert-butyl-3-methylcyclopentadienyl, 1-methyl-2-isopropylcyclopentadienyl, 1-methyl-3-isopropylcyclopentadienyl, 1-methyl-2-n-butylcyclopentadienyl, 1-methyl-3-n-butylcyclopentadienyl, $\eta^5$-1,2,3-trimethylcyclopentadienyl, $\eta^5$-1,2,4-trimethylcyclopentadienyl, tetramethylcyclopentadienyl, pentamethylcyclopentadienyl, indenyl, 4,5,6,7-tetrahydroindenyl, 2-methylindenyl, 3-methylindenyl, 4-methylindenyl, 5-methylindenyl, 6-methylindenyl, 7-methylindenyl, 2-tert-butylindenyl, 3-tert-butylindenyl, 4-tert-butylindenyl, 5-tert-butylindenyl, 6-tert-butylindenyl, 7-tert-butylindenyl, 2,3-dimethylindenyl, 4,7-dimethylindenyl, 2,4,7-trimethylindenyl, 2-methyl-4-isopropylindenyl, 4,5-benzindenyl, 2-methyl-4,5-benzindenyl, 4-phenylindenyl, 2-methyl-5-phenylindenyl, 2-methyl-4-phenylindenyl, 2-methyl-4-naphthylindenyl, fluorenyl, 2,7-dimethylfluorenyl, and 2,7-di-tert-butylfluorenyl groups.

Polydentate 1 of the group having a cyclopentadienide frame used in $L^1$ of the formula [3] is not particularly limited. η may be any value which can be taken by the group having a cyclopentadienide frame. Examples include pentadentate, tetradentate, tridentate, didentate and monodentate, preferable is pentadentate, tridentate or monodentate, and more preferable is pentadentate or tridentate.

Examples of a hetero atom in the group containing a hetero atom of $L^1$ in the formula [3] include an oxygen atom, a sulfur atom, a nitrogen atom, and a phosphorus atom and preferable examples of the group include an alkoxy group, an aryloxy group, a thioalkoxy group, a thioaryloxy group, an alkylamino group, an arylamino group, an alkylphosphino group, an arylphosphino group, a chelating ligand, or an aromatic heterocyclic ring group and an aliphatic heterocyclic ring group having an oxygen atom, a sulfur atom, a nitrogen atom, and/or a phosphorus atom in the ring.

Examples of the group containing a hetero atom of $L^1$ in the formula [3] include methoxy, ethoxy, propoxy, butoxy, phenoxy, 2-methylphenoxy, 2,6-dimethylphenoxy, 2,4,6-trimethylphenoxy, 2-ethylphenoxy, 4-n-propylphenoxy, 2-isopropylphenoxy, 2,6-diisopropylphenoxy, 4-sec-butylphenoxy, 4-tert-butylphenoxy, 2,6-di-sec-butylphenoxy, 2-tert-butyl-4-methylphenoxy, 2,6-di-tert-butylphenoxy, 4-methoxyphenoxy, 2,6-dimethoxyphenoxy, 3,5-dimethoxyphenoxy, 2-chlorophenoxy, 4-nitrosophenoxy, 4-nitrophenoxy, 2-aminophenoxy, 3-aminophenoxy, 4-aminothiophenoxy, 2,3,6-trichlorophenoxy, 2,4,6-trifluorophenoxy, thiomethoxy, dimethylamino, diethylamino, dipropylamino, diphenylamino, isopropylamino, tert-butylamino, pyrrolyl, dimethylphosphino, 2-(2-oxy-1-propyl)phenoxy, catechol, resorcinol, 4-isopropylcatechol, 3-methoxycatechol, 1,8-dihydroxynaphthyl, 1,2-dihydroxynaphthyl, 2,2'-biphenyldiol, 1,1'-bi-2-naphthol, 2,2'-dihydroxy-6,6'-dimethylbiphenyl, 4,4',6,6'-tetra-tert-butyl-2,2'methylenediphenoxy, and 4,4',6,6'-tetramethyl-2,2'-isobutylidenediphenoxy groups.

And, examples of the group containing a hetero atom also include a group represented by the following formula [7].

$$R^8{}_3 P = N— \qquad [7]$$

wherein $R^8$ groups each represent independently a hydrogen atom, a halogen atom or a hydrocarbyl group, the $R^8$ groups may be the same or different from each other, and among the $R^8$ groups, arbitrary 2 or more the $R^8$ groups may be bound to each other, or may form a ring structure.)

Examples of $R^8$ in the above-mentioned formula [7] include a hydrogen atom, a fluorine atom, a chlorine atom, a bromine atom, an iodine atom, methyl, ethyl, n-propyl, isopropyl, n-butyl, tert-butyl, cyclopropyl, cyclobutyl, cycloheptyl, cyclohexyl, phenyl, 1-naphthyl, 2-naphthyl, and benzyl groups.

Further, examples of the group containing a hetero atom, a group represented by the following formula [8] also include,

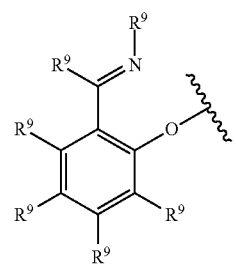

[8]

wherein $R^9$ groups each represent independently a hydrogen atom, a halogen atom, a hydrocarbyl group, a halogenated hydrocarbyl group, a hydrocarbyloxy group, a silyl group or an amino group, $R^9$ groups may be the same or different from each other, and among the $R^9$ groups, arbitrary 2 or more may be bound to each other, or may form a ring structure.

Examples of $R^9$ in the above-mentioned formula [8] include a hydrogen atom, a fluorine atom, a chlorine atom, a bromine atom, an iodine atom, phenyl, 1-naphthyl, 2-naphthyl, tert-butyl, 2,6-dimethylphenyl, 2-fluorenyl, 2-methylphenyl, 4-trifluoromethylphenyl, 4-methoxyphenyl, 4-pyridyl, cyclohexyl, 2-isopropylphenyl, benzyl, methyl, triethylsilyl, diphenylmethylsilyl, 1-methyl-1-phenylethyl, 1,1-dimethylpropyl, 2-chlorophenyl, and pentafluorophenyl groups.

A chelate ligand of $L^1$ in the formula [3] refers to a ligand having a plurality of coordination sites, and examples of the ligand include acetylacetonato, diimine, oxazoline, bisoxazoline, terpyridine, acylhydrazone, diethylenetriamine, triethylenetetramine, porphyrin, crown ether, and cryptate.

Examples of the heterocyclic group of $L^1$ in the formula [3] include a pyridyl group, a N-substituted imidazolyl group and a N-substituted indazolyl group and, among them, preferable is a pyridyl group.

When $L^1$ groups are linked via a residue containing a carbon atom, a silicon atom, a nitrogen atom, an oxygen atom, a sulfur atom or a phosphorus atom in the formula [3](that is, when groups having a cyclopentadienide frame are linked via the residue, when groups containing a hetero atom are linked via the residue, or when a group having a cyclopentadienide frame and a group containing a hetero atom are linked via the residue), the residue is preferably a divalent residue in which an atom binding to two $L^1$ groups is a carbon atom, a silicon atom, a nitrogen atom, an oxygen atom, a sulfur atom or a phosphorus atom, and the minimum atom number for binding the two $L^1$ groups is 3 or less. As the residue, an alkylene group such as a methylene group, an ethylene group and a propylene group; a substituted alkylene group such as a dimethylmethylene group (isopropylidene group) and a diphenylmethylene group; a substituted silylene group such as a silylene group, a dimethylsilylene group, a diethylsilylene group, a diphenylsilylene group, a tetramethyldisilylene group, and a dimethoxysilylene group; a hetero atom such as a nitrogen atom, an oxygen atom, a sulfur atom and a phosphorus atom can be described. Among them, particularly preferable is a methylene group, an ethylene group, a dimethylmethylene group (isopropylidene group), a diphenylmethylene group, a dimethylsilylene group, a diethylsilylene group, a diphenylsilylene group or a dimethoxysilylene group.

Examples of the halogen atom of $X^1$ in the formula [3] include a fluorine atom, a chlorine atom, a bromine atom and an iodine atom. Examples of the hydrocarbyl group of $X^{11}$ include an alkyl group, an aralkyl group, an aryl group and an alkenyl group and, among them, preferable is an alkyl group having 1 to 20 carbon atoms, an aralkyl group having 7 to 20 carbon atoms, an aryl group having 6 to 20 carbon atoms or an alkenyl group having 3 to 20 carbon atoms.

Examples of the alkyl group having 1 to 20 carbon atoms of $X^1$ include methyl, ethyl, n-propyl, isopropyl, n-butyl, sec-butyl, tert-butyl, isobutyl, n-pentyl, neopentyl, amyl, n-hexyl, n-octyl, n-decyl, n-dodecyl, n-pentadecyl, and n-eicosyl groups, and among them methyl, ethyl, isopropyl, tert-butyl, isobutyl or amyl group is especially preferable. All of these alkyl groups may be substituted with a halogen atom such as a fluorine atom, a chlorine atom, a bromine atom, and an iodine atom. Examples of an alkyl group substituted with a halogen atom include fluoromethyl, trifluoromethyl, chloromethyl, trichloromethyl, fluoroethyl, pentafluoroethyl, perfluoropropyl, perfluorobutyl, perfluorohexyl, perfluorooctyl, perchloropropyl, perchlorobutyl, and perbromopropyl groups. These alkyl groups may have alkoxy group such as methoxy group and ethoxy group, aryloxy group such as phenoxy group, and aralkyloxy group such as benzyloxy group as a substituent group.

Examples of the aralkyl group having 7 to 20 carbon atoms of $X^1$ include benzyl, (2-methylphenyl)methyl, (3-methylphenyl)methyl, (4-methylphenyl)methyl, (2,3-dimethylphenyl)methyl, (2,4-dimethylphenyl)methyl, (2,5-dimethylphenyl)methyl, (2,6-dimethylphenyl)methyl, (3,4-dimethylphenyl)methyl, (3,5-dimethylphenyl)methyl, (2,3,4-trimethylphenyl)methyl, (2,3,5-trimethylphenyl)methyl, (2,3,6-trimethylphenyl)methyl, (3,4,5-trimethylphenyl)methyl, (2,4,6-trimethylphenyl)methyl, (2,3,4,5-tetramethylphenyl)methyl, (2,3,4,6-tetramethylphenyl)methyl, (2,3,5,6-tetramethylphenyl)methyl, (pentamethylphenyl)methyl, (ethylphenyl)methyl, (n-propylphenyl)methyl, (isopropylphenyl)methyl, (n-butylphenyl)methyl, (sec-butylphenyl)methyl, (tert-butylphenyl)methyl, (n-pentylphenyl)methyl, (neopentylphenyl)methyl, (n-hexylphenyl)methyl, (n-octylphenyl)methyl, (n-decylphenyl)methyl, (n-dodecylphenyl)methyl, naphthylmethyl, and anthracenylmethyl groups, and benzyl group is more preferable. These aralkyl groups may have a halogen atom such as a fluorine atom, a chlorine atom, a bromine atom, and an iodine atom, alkoxy group such as methoxy group and ethoxy group, aryloxy group such as phenoxy group, and aralkyloxy group such as benzyloxy group as a substituent group.

Examples of the aryl group having 6 to 20 carbon atoms of $X^1$ include phenyl, 2-tolyl, 3-tolyl, 4-tolyl, 2,3-xylyl, 2,4-xylyl, 2,5-xylyl, 2,6-xylyl, 3,4-xylyl, 3,5-xylyl, 2,3,4-trimethylphenyl, 2,3,5-trimethylphenyl, 2,3,6-trimethylphenyl, 2,4,6-trimethylphenyl, 3,4,5-trimethylphenyl, 2,3,4,5-tetramethylphenyl, 2,3,4,6-tetramethylphenyl, 2,3,5,6-tetramethylphenyl, pentamethylphenyl, ethylphenyl, n-propylphenyl, isopropylphenyl, n-butylphenyl, sec-butylphenyl, tert-butylphenyl, n-pentylphenyl, neopentylphenyl, n-hexylphenyl, n-octylphenyl, n-decylphenyl, n-dodecylphenyl, n-tetradecylphenyl, naphthyl, and anthracenyl groups, and phenyl group is more preferable. These aryl groups may have a halogen atom such as a fluorine atom, a chlorine atom, a bromine atom, and an iodine atom, alkoxy group such as methoxy group and ethoxy group, aryloxy group such as phenoxy group, and aralkyloxy group such as benzyloxy group as a substituent group.

Examples of the alkenyl group having 3 to 20 carbon atoms of $X^1$ include an allyl group, a methallyl group, a crotyl group, and a 1,3-diphenyl-2-propenyl group and, among them, more preferable is an allyl group or a methallyl group.

Examples of the hydrocarbyloxy group of $X^1$ in the general formula [3] include an alkoxy group, an aralkyloxy group and an aryloxy group and, among them, preferable is an alkoxy group having 1 to 20 carbon atoms, an aralkyloxy group having 7 to 20 carbon atoms or an aryloxy group having 6 to 20 carbon atoms.

Examples of the alkoxy group having 1 to 20 carbon atoms of $X^1$ include methoxy, ethoxy, n-propoxy, isopropoxy, n-butoxy, sec-butoxy, tert-butoxy, n-pentoxy, neopentoxy, n-hexoxy, n-octoxy, n-dodesoxy, n-pentadesoxy, and n-eicoxy group, and among them, preferable are a methoxy group, an ethoxy group, an isopropoxy group, and a tert-butoxy group. These alkoxy groups may have a halogen atom such as a fluorine atom, a chlorine atom, a bromine atom, and an iodine atom, alkoxy group such as methoxy group and ethoxy group, aryloxy group such as phenoxy group, and aralkyloxy group such as benzyloxy group as a substituent group.

Examples of the aralkyloxy group having 7 to 20 carbon atoms of $X^1$ include benzyloxy, (2-methylphenyl)methoxy, (3-methylphenyl)methoxy, (4-methylphenyl)methoxy, (2,3-dimethylphenyl)methoxy, (2,4-dimethylphenyl)methoxy, (2,5-dimethylphenyl)methoxy, (2,6-dimethylphenyl)methoxy, (3,4-dimethylphenyl)methoxy, (3,5-dimethylphenyl)methoxy, (2,3,4-trimethylphenyl)methoxy, (2,3,5-trimethylphenyl)methoxy, (2,3,6-trimethylphenyl)methoxy, (2,4,5-trimethylphenyl)methoxy, (2,4,6-trimethylphenyl)methoxy, (3,4,5-trimethylphenyl)methoxy, (2,3,4,5-tetramethylphenyl)methoxy, (2,3,4,6-tetramethylphenyl)methoxy, (2,3,5,6-tetramethylphenyl)methoxy, (pentamethylphenyl)methoxy, (ethylphenyl)methoxy, (n-propylphenyl)methoxy, (isopropylphenyl)methoxy, (n-butylphenyl)methoxy, (sec-butylphenyl)methoxy, (tert-butylphenyl)methoxy, (n-hexylphenyl) methoxy, (n-octylphenyl)methoxy, (n-decylphenyl)methoxy, naphthylmethoxy, and anthracenylmethoxy groups, and among them more preferable is a benzyloxy group. These aralkyloxy groups may have a halogen atom such as a fluorine atom, a chlorine atom, a bromine atom, and an iodine atom, alkoxy group such as methoxy group and ethoxy group, aryloxy group such as phenoxy group, and aralkyloxy group such as benzyloxy group as a substituent group.

Examples of the aryloxy group having 6 to 20 carbon atoms of $X^1$ include phenoxy, 2-methylphenoxy, 3-methylphenoxy, 4-methylphenoxy, 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2-tert-butyl-3-methylphenoxy, 2-tert-butyl-4-methylphenoxy, 2-tert-butyl-5-methylphenoxy, 2-tert-butyl-6-methylphenoxy, 2,3,4-trimethylphenoxy, 2,3,5-trimethylphenoxy, 2,3,6-trimethylphenoxy, 2,4,5-trimethylphenoxy, 2,4,6-trimethylphenoxy, 2-tert-butyl-3,4-dimethylphenoxy, 2-tert-butyl-3,5-dimethylphenoxy, 2-tert-butyl-3,6-dimethylphenoxy, 2,6-di-tert-butyl-3-methylphenoxy, 2-tert-butyl-4,5-dimethylphenoxy, 2,6-di-tert-butyl-4-methylphenoxy, 3,4,5-trimethylphenoxy, 2,3,4,5-tetramethylphenoxy, 2-tert-butyl-3,4,5-trimethylphenoxy, 2,3,4,6-tetramethylphenoxy, 2-tert-butyl-3,4,6-trimethylphenoxy, 2,6-di-tert-butyl-3,4-dimethylphenoxy, 2,3,5,6-tetramethylphenoxy, 2-tert-butyl-3,5,6-trimethylphenoxy, 2,6-di-tert-butyl-3,5-dimethylphenoxy, pentamethylphenoxy, ethylphenoxy, n-propylphenoxy, isopropylphenoxy, n-butylphenoxy, sec-butylphenoxy, tert-butylphenoxy, n-hexylphenoxy, n-octylphenoxy, n-decylphenoxy, n-tetradecylphenoxy, naphthoxy, and anthracenoxy groups. These aryloxy groups may have a halogen atom such as a fluorine atom, a chlorine atom, a bromine atom, and an iodine atom, alkoxy group such as methoxy group and ethoxy group, aryloxy group such as phenoxy group, and aralkyloxy group such as benzyloxy group as a substituent group.

Examples of $X^1$ in the formula [3] include more preferably a chlorine atom, methyl, ethyl, n-propyl, isopropyl, n-butyl, methoxy, ethoxy, n-propoxy, isopropoxy, n-butoxy, trifluoromethoxy, phenyl, phenoxy, 2,6-di-tert-butylphenoxy, 3,4,5-trifluorophenoxy, pentafluorophenoxy, 2,3,5,6-tetrafluoro-4-pentafluorophenylphenoxy, and benzyl groups.

And, a in the formula [3] is a number satisfying 0<a≤3, and b is a number satisfying 0<b≤3. And, a and b are appropriately selected depending on a valence of $M^2$. When $M^2$ is a titanium atom, a zirconium atom or a hafnium atom, a is preferably 2, and b is also preferably 2.

Examples of a compound having a titanium atom, a zirconium atom, or a hafnium atom as a transition metal atom and represented by the formula [3] include bis(cyclopentadienyl)titanium dichloride, bis(methylcyclopentadienyl)titanium dichloride, bis(ethylcyclopentadienyl)titanium dichloride, bis(n-butylcyclopentadienyl)titanium dichloride, bis(tert-butylcyclopentadienyl)titanium dichloride, bis(1,2-dimethylcyclopentadienyl)titanium dichloride, bis(1,3-dimethylcyclopentadienyl)titanium dichloride, bis(1-methyl-2-ethylcyclopentadienyl)titanium dichloride, bis(1-methyl-3-ethylcyclopentadienyl)titanium dichloride, bis(1-methyl-2-n-butylcyclopentadienyl)titanium dichloride, bis(1-methyl-3-n-butylcyclopentadienyl)titanium dichloride, bis(1-methyl-2-isopropylcyclopentadienyl)titanium dichloride, bis(1-methyl-3-isopropylcyclopentadienyl)titanium dichloride, bis(1-tert-butyl-2-methylcyclopentadienyl)titanium dichloride, bis(1-tert-butyl-3-methylcyclopentadienyl)titanium dichloride, bis(1,2,3-trimethylcyclopentadienyl)titanium dichloride, bis(1,2,4-trimethylcyclopentadienyl)titanium dichloride, bis(tetramethylcyclopentadienyl)titanium dichloride, bis(pentamethylcyclopentadienyl)titanium dichloride, bis(indenyl)titanium dichloride, bis(4,5,6,7-tetrahydroindenyl)titanium dichloride, bis(fluorenyl)titanium dichloride, bis(2-phenylindenyl)titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl)indenyl]titanium dichloride, bis[2-(4-methylphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl(fluorenyl)titanium dichloride, pentamethylcyclopentadienyl(indenyl)titanium dichloride, pentamethylcyclopentadienyl(fluorenyl)titanium dichloride, cyclopentadienyl(2-phenylindenyl)titanium dichloride, pentamethylcyclopentadienyl(2-phenylindenyl)titanium dichloride, dimethylsilylenebis(cyclopentadienyl)titanium dichloride, dimethylsilylenebis(2-methylcyclopentadienyl)titanium dichloride, dimethylsilylenebis(3-methylcyclopentadienyl)titanium dichloride, dimethylsilylenebis(2-n-butylcyclopentadienyl)titanium dichloride, dimethylsilylenebis(3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis(2,3-ethylmethylcyclopentadienyl)titanium dichloride, dimethylsilylenebis(2,4-ethylmethylcyclopentadienyl)titanium dichloride, dimethylsilylenebis(2,5-ethylmethylcyclopentadienyl)titanium dichloride, dimethylsilylenebis(3,5-ethylmethylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis(2,4,7-trimethylindenyl)titanium dichloride, dimethylsilylenebis(2-methyl-4-isopropylindenyl)titanium dichloride, dimethylsilylenebis(4,5-benzindenyl)titanium dichloride, dimethylsilylenebis(2-methyl-4,5-benzindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, dimethylsilylenebis(2-methyl-5-phenylindenyl)titanium dichloride, dimethylsilylenebis(2-methyl-4-naphthylindenyl)titanium dichloride, dimethylsilylenebis(4,5,6,7-tetrahydromndenyl)titanium dichloride, dimethylsilylene(cyclopentadienyl)(indenyl)titanium dichloride, dimethylsilylene(methylcyclopentadienyl)(indenyl)titanium dichloride, dimethylsilylene(n-butylcyclopentadienyl)(indenyl)titanium dichloride, dimethylsilylene(tetramethylcyclopentadienyl)(indenyl)titanium dichloride, dimethylsilylene(cyclopentadienyl)(fluorenyl)titanium dichloride, dimethylsilylene(methylcyclopentadienyl)(fluorenyl)titanium dichloride, dimethylsilylene(n-butylcyclopentadienyl)(fluorenyl)titanium dichloride, dimethylsilylene(tetramethylcyclopentadienyl)(indenyl)titanium dichloride, dimethylsilylene(indenyl)(fluorenyl)titanium dichloride, dimethylsilylenebis(fluorenyl)titanium dichloride, dimethylsilylene(cyclopentadienyl)(tetramethylcyclopentadienyl)titanium dichloride, dimethylsilylene(tetramethylcyclopentadienyl)(fluorenyl)titanium dichloride, cyclopentadienyltitanium trichloride, pentamethylcyclopentadienyltitanium trichloride, cyclopentadienyl(dimethylamido)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl)titanium dichloride, pentamethylcyclopentadienyl(2,6-dimethylphenyl)titanium dichloride, pentamethylcyclopentadienyl(2,6-diisopropylphenyl)titanium dichloride, pentamethylcyclopentadienyl(2,6-tert-butylphenyl)titanium dichloride, indenyl(2,6-diisopropylphenyl)titanium dichloride, fluorenyl(2,6-diisopropylphenyl)titanium dichloride, dimethylsilylene(cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxytitanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy)titanium dichloride, dimethylsilylene(cyclopentadienyl)(3-phenyl-2-phenoxy)titanium dichloride, dimethylsilylene(cyclopentadienyl)(1-naphthoxy-2-yl)titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene(methylcyclopentadienyl)(5-methyl-3-phenyl-2-phenoxy)titanium dichloride, dimethylsilylene(methylcyclopentadienyl)(3-tert-butyldimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-diamyl-2-phenoxy)titanium dichloride, dimethylsilylene(methylcyclopentadienyl)(3-phenyl-2-phenoxy)titanium dichloride, dimethylsilylene(methylcyclopentadienyl)(1-naphthoxy-2-yl)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy)titanium dichloride, dimethylsilylene(n-butylcyclopentadienyl)(3,5-diamyl-2-phenoxy)titanium dichloride, dimethylsilylene(n-butylcyclopentadienyl)(3-phenyl-2-phenoxy)titanium dichloride, dimethylsilylene(n-butylcyclopentadienyl)(1-naphthoxy-2-yl)titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)titanium dichloride, dimethylsilylene(tert-butylcyclopentadienyl)(5-methyl-3-phenyl-2-phenoxy)titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy)titanium dichloride, dimethylsilylene(tert-butylcyclopentadienyl)(3-tert-butyl-5-chloro-2-phenoxy)titanium dichloride, dimethylsilylene(tert-butylcyclopentadienyl)(3,5-diamyl-2-phenoxy)titanium dichloride, dimethylsilylene(tert-butylcyclopentadienyl)(3-phenyl-2-phenoxy)titanium dichloride, dimethylsilylene(tert-butylcyclopentadienyl)(1 naphthoxy-2-yl)titanium dichloride, dimethylsilylene(tetramethylcyclopentadienyl)(2-phenoxy)titanium dichloride, dimethylsilylene(tetramethylcyclopentadienyl)(3-methyl-2-phenoxy)titanium dichloride, dimethylsilylene(tetramethylcyclopentadienyl)(3,5-dimethyl-2-phenoxy)titanium dichloride, dimethylsilylene(tetramethylcyclopentadienyl)(3-tert-butyl-2-phenoxy)titanium dichloride, dimethylsilylene(tetramethylcyclopentadienyl)(3-tert-butyl-5-methyl-2-phenoxy)titanium dichloride, dimethylailylene(tetramethylcyclopentadienyl)(3,5-di-tert-butyl-2-phenoxy)titamium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyldimethylsilyl-5-methyl-2-phenoxy)titanium dichloride, dimethylsilylene(tetramethylcyclopentadienyl)(5-methyl-3-trimethylsilyl-2-phenoxy)titanium dichloride, dimethylsilylene(tetramethylcyclopentadienyl)(3-tert-butyl-5-methoxy-2- phe noxy)titanium dichloride, dimethylsilylene (tetramethylcyclopentadienyl)(3-tert-butyl-5-chloro-2-phenoxy)titanium dichloride, dimethylsilylene (tetramethylcyclopentadienyl)(3,5-diamyl-2-phenoxy) titanium dichloride, dimethylsilylene (tetramethylcyclopentadienyl)(3-phenyl-2-phenoxy) titanium dichloride, dimethylsilylene (tetramethylcyclopentadienyl)(1-naphthoxy-2-yl)titanium dichloride, dimethylsilylene(trimethylsilylcyclopentadienyl) (2-phenoxy)titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy)titanium dichloride, dimethylsilylene (trimethylsilylcyclopentadienyl)(3-tert-butyl-2-phenoxy) titanium dichloride, dimethylsilylene (trimethylsilylcyclopentadienyl)(3-tert-butyl-5-methyl-2-phenoxy)titanium dichloride, dimethylsilylene (trimethylsilylcyclopentadienyl)(3,5-di-tert-butyl-2-phenoxy)titanium dichloride, dimethylsilylene (trimethylsilylcyclopentadienyl)(5-methyl-3-phenyl-2-phenoxy)titanium dichloride, dimethylsilylene (trimethylsilylcyclopentadienyl)(3-tert-butyldimethylsilyl-5-methyl-2-phenoxy)titanium dichloride, dimethylsilylene (trimethylsilylcyclopentadienyl)(5-methyl-3-trimethylsilyl-2-phenoxy)titanium dichloride, dimethylsilylene (trimethylsilylcyclopentadienyl)(3-tert-butyl-5-methoxy-2-phenoxy)titanium dichloride, dimethylsilylene (trimethylsilylcyclopentadienyl)(3-tert-butyl-5-chloro-2-phenoxy)titanium dichloride, dimethylsilylene (trimethylsilylcyclopentadienyl)(3,5-diamyl-2-phenoxy) titanium dichloride, dimethylsilylene (trimethylsilylcyclopentadienyl)(3-phenyl-2-phenoxy) titanium dichloride, dimethylsilylene (trimethylsilylcyclopentadienyl)(1-naphthoxy-2-yl)titanium dichloride, dimethylsilylene(indenyl)(2-phenoxy)titanium dichloride, dimethylsilylene(indenyl)(3-methyl-2-phenoxy) titanium dichloride, dimethylsilylene(indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene (indenyl)(5-methyl-3-phenyl-2-phenoxy)titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene (indenyl)(3-tert-butyl-5-chloro-2-phenoxy)titanium dichloride, dimethylsilylene(indenyl)(3,5-diamyl-2-phenoxy)titanium dichloride, dimethylsilylene(indenyl)(3-phenyl-2-phenoxy)titanium dichloride, dimethylsilylene(indenyl)(1-naphthoxy-2-yl)titanium dichloride, dimethylsilylene (fluorenyl)(2-phenoxy)titanium dichloride, dimethylsilylene (fluorenyl)(3-methyl-2-phenoxy)titanium dichloride, dimethylsilylene(fluorenyl)(3,5-dimethyl-2-phenoxy)titanium dichloride, dimethylsilylene(fluorenyl)(3-tert-butyl-2-phenoxy)titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy)titanium dichloride, dimethylsilylene(fluorenyl)(5-methyl-3-phenyl-2-phenoxy)titanium dichloride, dimethylsilylene (fluorenyl)(3-tert-butyldimethylsilyl-5-methyl-2-phenoxy) titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-diamyl-2-phenoxy)titanium dichloride, dimethylsilylene(fluorenyl)(3-phenyl-2-phenoxy)titanium dichloride, dimethylsilylene(fluorenyl)(1-naphthoxy-2-yl)titanium dichloride, (tert-butylamido)tetramethylcyclopentadienyl-1,2-ethanediyltitanium dichloride, (methylamido)tetramethylcyclopentadienyl-1,2-ethanediyltitanium dichloride, (ethylamido)tetramethylcyclopentadienyl-1,2-ethanediyltitanium dichloride, (tert-butylamido)tetramethylcyclopentadienyldimethylsilanetitanium dichloride, (benzylamido)tetramethylcyclopentadienyldimethylsilanetitanium dichloride, (phenylphosphido) tetramethylcyclopentadienyldimethylsilanetitanium dichloride, (tert-butylamido)indenyl-1,2-ethanediyltitanium dichloride, (tert-butylamido)tetrahydroindenyl-1,2-ethanediyltitanium dichloride, (tert-butylamido)fluorenyl-1,2-ethanediyltitanium dichloride, (tert-butylamido)indenyldimethylsilanetitanium dichloride, (tert-butylamido) tetrahydroindenyldimethylsilanetitanium dichloride, (tert-butylamido)fluorenyldimethylsilanetitanium dichloride, (dimethylaminomethyl)tetramethylcyclopentadienyltitanium(III) dichloride, (dimethylaminoethyl)tetramethylcyclopentadienyltitanium(III) dichloride, (dimethylaminopropyl)tetramethylcyclopentadienyltitanium(III) dichloride, (N-pyrrolidinylethyl)tetramethylcyclopentadienyltitanium dichloride, (B-dimethylaminoborabenzene)cyclopentadienyltitanium dichloride, cyclopentadienyl(9-mesitylbora-anthracenyl)titanium dichloride, 2,2'-thiobis[4-methyl-6-tert-butylphenoxy]titanium dichloride, 2,2'-thiobis[4-methyl-6-(1-methylethyl)phenoxy]titanium dichloride, 2,2'-thiobis(4,6-dimethylphenoxy) titanium dichloride, 2,2'-thiobis(4-methyl-6-tert-butylphenoxy)titanium dichloride, 2,2'-methylenebis(4-methyl-6-tert-butylphenoxy)titanium dichloride, 2,2'-ethylenebis(4-methyl-6-tert-butylphenoxy)titanium dichloride, 2,2'-sulfinylbis(4-methyl-6-tert-butylphenoxy)titanium dichloride, 2,2'-(4,4',6,6'tetratert-butyl-1,1'biphenoxy)titanium dichloride, (di-tert-butyl-1,3-propanediamido)titanium dichloride, (dicyclohexyl-1,3-propanediamido)titanium dichloride,

[bis(trimethylsilyl)-1,3-propanediamido]titanium dichloride, [bis(tert-butyldimethylsilyl)-1,3-propanediamido]titanium dichloride, [bis(2,6-dimethylphenyl)-1,3-propanediamido]titanium dichloride, [bis(2,6-diisopropylphenyl)-1,3-propanediamido]titanium dichloride, [bis(2,6-di-tert-butylphenyl)-1,3-propanediamido]titanium dichloride, [bis(triisopropylsilyl)naphthalenediamido]titanium dichloride, [bis(trimethylsilyl)naphthalenediamido]titanium dichloride, [bis(tert-butyldimethylsilyl)naphthalenediamido]titanium dichloride, [hydrotris(3,5-dimethylpyrazolyl)borate]titanium trichloride, [hydrotris(3,5-diethylpyrazolyl)borate]titanium trichloride, [hydrotris(3,5-di-tert-butylpyrazolyl)borate]titanium trichloride, [tris(3,5-dimethylpyrazolyl) methyl]titanium trichloride, [tris(3,5-diethylpyrazolyl) methyl]titanium trichloride, and [tris(3,5-di-tert-butylpyrazolyl)methyl]titanium trichloride, and compounds named by replacing "titanium" in the names of these compounds with "zirconium" and "hafnium" and by replacing "(2-phenoxy)" in the names with "(3-phenyl-2-phenoxy)", "(3-trimethylsilyl-2-phenoxy)", or "(3-tert-butyldimethylsilyl-2-phenoxy)", and by replacing "dimethylsilylene" in the names with "methylene", "ethylene", "dimethylmethylene (isopropylidene)", "diphenylmethylene", "diethylsilylene", "diphenylsilylene", or "dimethoxysilylene", by replacing "dichloride" in the names with "difluoride", "dibromide", "diiodide", "dimethyl", "diethyl", "diisopropyl", "diphenyl", "dibenzyl", "dimethoxide", "diethoxide", "di(n-propoxide)", "di(isopropoxide)", "diphenoxide", or "di(pentafluorophenoxide)", and by replacing "trichloride" in the names with "trifluoride", "tribromide", "triiodide", "trimethyl", "triethyl", "triisopropyl", "triphenyl", "tribenzyl", "trimethoxide", "triethoxide", "tri(n-propoxide)", "tri(isopropoxide)", "triphenoxide", or "tri(pentafluorophenoxide)".

Only one kind of these transition metal compounds may be used, or two or more kinds may be used by combining them.

Among transition metal compounds exemplified above, the transition metal compound (A) used in the present invention is preferably a compound in which $M^2$ is zirconium, and a transition metal compound having at least one group having a cyclopentadienide frame as $L^1$ in the formula [3]. Among them, a zirconium compound having two groups having a cyclopentadienide frame as $L^1$ in the formula [3], in which the $L^1$ groups are linked to each other via a residue containing a carbon atom, a silicon atom, an oxygen atom, a sulfur atom or a phosphorus atom is particularly preferable.

The transition metal compound represented by the formula [3] can be produced by the production methods described in JP 6-340684 A, JP 7-258321 A, International Patent Publication No. 95/00562 or the like.

(B) Activating Agent

The activating agent used in the present invention may be any activating agent as far as it can activate (A) the transition metal compound or a μ-oxo type transition metal compound dimer thereof. When polymerization (e.g. slurry polymerization, vapor phase polymerization, bulk polymerization etc.) accompanied with formation of a generated addition polymer particle is performed, it is preferable to fix a shape of a generated addition polymer using a specific particle as one of catalyst components, and modified particles of the following (I), the following (II) and the following (III) can be suitably used.

(I): Modified particle obtained by bringing the following (a), the following (b), the following (c) and the following (d) into contact with one another, (a): Compound represented by the following general formula [4]

(b): Compound represented by the following general formula [5]

(c): Compound represented by the following general formula [6]

(d): Inorganic oxide particle or organic polymer particle wherein, in the general formulas [4] to [6], $M^3$ represents a main group metal atom of Group 12 of the Periodic Table, $L^2$ represents a hydrogen atom, a halogen atom or a hydrocarbyl group and, the $L^2$ groups may be the same or different from each other, $R^6$ represents an electron withdrawing group or a group containing an electron withdrawing group and, when there are more than one $R^6$, they may be the same or different from each other, $R^7$ represents a hydrocarbyl group or a halogenated hydrocarbyl group, T each represents independently an atom of Group 15 or Group 16 of the Periodic Table, and t represents a valence of T of each compound.

(II): Modified particle obtained by bringing inorganic oxide particle or organic polymer particle (d), and aluminoxane (e) into contact with one another (III): Modified particle obtained by bringing inorganic oxide particle or organic polymer particle (d), aluminoxane (e) and transition metal compound into contact with one another These will be further explained sequentially below.

$M^3$ in the general formula [4] represents a main group metal atom of Group 12 of the Periodic Table of an element (IUPAC Nomenclature of Inorganic Chemistry revised edition 1989). Examples thereof include a zinc atom, a cadmium atom, and a mercury atom. $M^3$ is particularly preferably a zinc atom.

In the general formula [4], $L^2$ is a hydrogen atom, a halogen atom or a hydrocarbyl group. Examples of the halogen atom of $L^2$ include a fluorine atom, a chlorine atom, a bromine atom and an iodine atom. The hydrocarbyl group of $L^2$ is preferably an alkyl group, an aryl group, or an aralkyl group.

The alkyl group of the hydrocarbyl group of $L^2$ is preferably an alkyl group having 1 to 20 carbon atoms, examples include a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-heptyl group, a n-octyl group, a n-decyl group, a n-dodecyl group, a n-pentadecyl group, and a n-eicosyl group, and more preferable is a methyl group, an ethyl group, an isopropyl group, a tert-butyl group or an isobutyl group.

The alkyl groups may be substituted with a halogen atom such as a fluorine atom, a chlorine atom, a bromine atom, and an iodine atom. Examples of the alkyl group having 1 to 20 carbon atoms substituted with a halogen atom include fluoromethyl, difluoromethyl, trifluoromethyl, fluoroethyl, difluoroethyl, trifluoroethyl, tetrafluoroethyl, pentafluoroethyl, perfluoropropyl, perfluorobutyl, perfluoropentyl, perfluorohexyl, perfluorooctyl, perfluorododecyl, perfluoropentadecyl, perfluoroeicosyl, 1H, 1H-perfluoropropyl, 1H, 1H-perfluorobutyl, 1H, 1H-perfluoropentyl, 1H,1H-perfluorohexyl, 1H,1H-perfluorooctyl, 1H, 1H-perfluorododecyl, 1H, 1H-perfluoropentadecyl, 1H, 1H-perfluoroeicosyl groups, and alkyl groups named by replacing "fluoro" in the names of these alkyl groups with "chloro", "bromo" and "iodo". All of these alkyl groups may be substituted with an alkoxy group such as methoxy group and ethoxy group, an aryloxy group such as phenoxy group, and an aralkyloxy group such as benzyloxy group.

Preferable examples of aryl group of hydrocarbyl group of $L^2$ include an aryl group having 6 to 20 carbon atoms and examples thereof include phenyl, 2-tolyl, 3-tolyl, 4-tolyl, 2,3-xylyl, 2,4-xylyl, 2,5-xylyl, 2,6-xylyl, 3,4-xylyl, 3,5-xylyl, 2,3,4-trimethylphenyl, 2,3,5-trimethylphenyl, 2,3,6-trimethylphenyl, 2,4,6-trimethylphenyl, 3,4,5-trimethylphenyl, 2,3,4,5-tetramethylphenyl, 2,3,4,6-tetramethylphenyl, 2,3,5,6-tetramethylphenyl, pentamethylphenyl, ethylphenyl, n-propylphenyl, isopropylphenyl, n-butylphenyl, sec-butylphenyl, tert-butylphenyl, isobutylphenyl, n-pentylphenyl, neopentylphenyl, n-hexylphenyl, n-octylphenyl, n-decylphenyl, n-dodecylphenyl, n-tetradecylphenyl, naphthyl, and anthracenyl groups, and phenyl group is more preferable. These aryl groups may have a halogen atom such as a fluorine atom, a chlorine atom, a bromine atom, and an iodine atom, an alkoxy group such as methoxy group and ethoxy group, an aryloxy group such as phenoxy group, or an aralkyloxy group such as benzyloxy group as a substituent group.

Preferable examples of aralkyl group of hydrocarbyl group of $L^2$ include an aralkyl group having 7 to 20 carbon atoms and examples thereof include benzyl, (2-methylphenyl)methyl, (3-methylphenyl)methyl, (4-methylphenyl)methyl, (2,3-dimethylphenyl)methyl, (2,4-dimethylphenyl)methyl, (2,5- dimethylphenyl)methyl, (2,6-dimethylphenyl)methyl, (3,4-dimethylphenyl)methyl, (3,5-dimethylphenyl)methyl, (2,3,4-trimethylphenyl)methyl, (2,3,5-trimethylphenyl)methyl, (2,3,6-trimethylphenyl)methyl, (3,4,5-trimethylphenyl)methyl, (2,4,6-trimethylphenyl)methyl, (2,3,4,5-tetramethylphenyl)methyl, (2,3,4,6-tetramethylphenyl)methyl, (2,3,5,6-tetramethylphenyl)methyl, (pentamethylphenyl)methyl, (ethylphenyl)methyl, (n-propylphenyl)methyl, (isopropylphenyl)methyl, (n-butylphenyl)methyl, (sec-butylphenyl)methyl, (tert-butylphenyl)methyl, (isobutylphenyl)methyl, (n-pentylphenyl)methyl, (neopentylphenyl)methyl, (n-hexylphenyl)methyl, (n-octylphenyl)methyl, (n-decylphenyl)methyl, naphthylmethyl, and anthracenylmethyl groups, and a benzyl group is especially preferable. These aralkyl groups may have a halogen atom such as a fluorine atom, a chlorine atom, a bromine atom, and an iodine atom, an alkoxy group such as a methoxy group and an ethoxy group, an aryloxy group such as a phenoxy group, or an aralkyloxy group such as a benzyloxy group as a substituent group.

$L^2$ of the formula [4] is preferably a hydrogen atom, an alkyl group or an aryl group, further preferably a hydrogen atom or an alkyl group, and particularly preferably an alkyl group.

T in the general formula [5] or [6] each represent independently an atom of Group 15 or Group 16 of the Periodic Table of the Elements (IUPAC Nomenclature of Inorganic Chemistry revised edition 1989). T in the general formula [5] and T in the general formula [6] may be the same or different. Examples of Group 15 atom include a nitrogen atom, a phosphorus atom and the like, and examples of Group 16 atom include an oxygen atom, a sulfur atom and the like. T is preferably each independently a nitrogen atom or an oxygen atom and, particularly preferably, an oxygen atom.

And, t in the general formula [5] or [6] represents a valence of each T, and when T is Group 15 atom, t is 3, and when T is Group 16 atom, t is 2.

$R^6$ in the general formula [5] represents an electron withdrawing group or a group containing an electron withdrawing group, and when there are more than one $R^6$, they may be the same or different from each other. As an index of electron withdrawability, a substituent constant σ of a Hammett rule or the like is known. Examples of the electron withdrawing group include a functional group in which a substituent constant σ of a Hammett rule is positive.

Examples of the electron withdrawing group include a fluorine atom, a chlorine atom, a bromine atom, an iodine atom, a cyano group, a nitro group, a carbonyl group, a sulfone group, a phenyl group and the like. Examples of the group containing an electron withdrawing group include a halogenated alkyl group, a halogenated aryl group, a (halogenated alkyl) aryl group, a cyanidated aryl group, a nitrated aryl group, an ester group (alkoxycarbonyl group, aralkyloxycarbonyl group and an aryloxycarbonyl group) and the like.

Examples of the halogenated alkyl group include fluoromethyl, chloromethyl, bromomethyl, iodomethyl, difluoromethyl, dichloromethyl, dibromomethyl, diiodomethyl, trifluoromethyl, trichloromethyl, tribromomethyl, triiodomethyl, 2,2,2-trifluoroethyl, 2,2,2-trichloroethyl, 2,2,2-tribromoethyl, 2,2,2-triiodoethyl, 2,2,3,3,3-pentafluoropropyl, 2,2,3,3,3-pentachloropropyl, 2,2,3,3,3-pentabromopropyl, 2,2,3,3,3-pentaiodopropyl, 2,2,2-trifluoro-1-trifluoromethylethyl, 2,2,2-trichloro-1-trichloromethylethyl, 2,2,2-tribromo-1-tribromomethylethyl, 2,2,2-triiodo-1-triiodomethylethyl, 1,1-bis(trifluoromethyl)-2,2,2-trifluoroethyl, 1,1-bis(trichloromethyl)-2,2,2-trichloroethyl, 1,1-bis(tribromomethyl)-2,2,2-tribromoethyl, 1,1-bis(triiodomethyl)-2,2,2-triiodoethyl groups and the like.

Examples of the halogenated aryl group include 2-fluorophenyl, 3-fluorophenyl, 4-fluorophenyl, 2,4-difluorophenyl, 2,6-difluorophenyl, 3,4-difluorophenyl, 3,5-difluorophenyl, 2,4,6-trifluorophenyl, 3,4,5-trifluorophenyl, 2,3,5,6-tetrafluorophenyl, pentafluorophenyl, 2,3,5,6-tetrafluoro-4-trifluoromethylphenyl, 2,3,5,6-tetrafluoro-4-pentafluorophenylphenyl, perfluoro-1-naphthyl, perfluoro-2-naphthyl, 2-chlorophenyl, 3-chlorophenyl, 4-chlorophenyl, 2,4-dichlorophenyl, 2,6-dichlorophenyl, 3,4-dichlorophenyl, 3,5-dichlorophenyl, 2,4,6-trichlorophenyl, 3,4,5-trichlorophenyl, 2,3,5,6-tetrachlorophenyl, pentachlorophenyl, 2,3,5,6-tetrachloro-4-trichloromethylphenyl, 2,3,5,6-tetrachloro-4-pentachlorophenylphenyl, perchloro-1-naphthyl, perchloro-2-naphthyl, 2-bromophenyl, 3-bromophenyl, 4-bromophenyl, 2,4-dibromophenyl, 2,6-dibromophenyl, 3,4-dibromophenyl, 3,5-dibromophenyl, 2,4,6-tribromophenyl, 3,4,5-tribromophenyl, 2,3,5,6-tetrabromophenyl, pentabromophenyl, 2,3,5,6-tetrabromo-4-tribromomethylphenyl, 2,3,5,6-tetrabromo-4-pentabromophenylphenyl, perbromo-1-naphthyl, perbromo-2-naphthyl, 2-iodophenyl, 3-iodophenyl, 4-iodophenyl, 2,4-diiodophenyl, 2,6-diiodophenyl, 3,4-diiodophenyl, 3,5-diiodophenyl, 2,4,6-triiodophenyl, 3,4,5-triiodophenyl, 2,3,5,6-tetraiodophenyl, pentaiodophenyl, 2,3,5,6-tetraiodo-4-triiodomethylphenyl, 2,3,5,6-tetraiodo-4-pentaiodophenylphenyl, periodo-1-naphthyl, periodo-2-naphthyl groups and the like.

Examples of a (halogenated alkyl)aryl group may be 2-(trifluoromethyl)phenyl, 3-(trifluoromethyl)phenyl, 4-(trifluoromethyl)phenyl, 2,6-bis(trifluoromethyl)phenyl, 3,5-bis(trifluoromethyl)phenyl, 2,4,6-tris(trifluoromethyl)phenyl, 3,4,5-tris(trifluoromethyl)phenyl groups and the like.

Examples of the cyanidated aryl group include a 2-cyanophenyl group, a 3-cyanophenyl group, a 4-cyanophenyl group and the like.

Examples of the nitrated aryl group include a 2-nitrophenyl group, a 3-nitrophenyl group, a 4-nitrophenyl group and the like.

Examples of the ester group include a methoxycarbonyl group, an ethoxycarbonyl group, a normal propoxycarbonyl group, an isopropoxycarbonyl group, a phenoxycarbonyl group, a trifluoromethoxycarbonyl group, a pentafluorophenoxycarbonyl group and the like.

Preferable examples of $R^6$ include a halogenated hydrocarbyl group and more preferable examples include a halogenated alkyl group and a halogenated aryl group. Furthermore preferable examples include fluoromethyl, difluoromethyl, trifluoromethyl, 2,2,2-trifluoroethyl, 2,2,3,3,3-pentafluoropropyl, 2,2,2-trifluoro-1-trifluoromethylethyl, 1,1-bis(trifluoromethyl)-2,2,2-trifluoroethyl, 2-fluorophenyl, 3-fluorophenyl, 4-fluorophenyl, 2,4-difluorophenyl, 2,6-difluorophenyl, 3,4-difluorophenyl, 3,5-difluorophenyl, 2,4,6-trifluorophenyl, 3,4,5-trifluorophenyl, 2,3,5,6-tetrafluorophenyl, pentafluorophenyl, 2,3,5,6-tetrafluoro-4-trifluoromethylphenyl, 2,3,5,6-tetrafluoro-4-pentafluorophenylphenyl, perfluoro-1-naphthyl, perfluoro-2-naphthyl, chloromethyl, dichloromethyl, trichloromethyl, 2,2,2-trichloroethyl, 2,2,3,3,3-pentachloropropyl, 2,2,2-trichloro-1-trichloromethylethyl, 1,1-bis(trichloromethyl)-2,2,2-trichloroethyl, 4-chlorophenyl, 2,6-dichlorophenyl, 3,5-dichlorophenyl, 2,4,6-trichlorophenyl, 3,4,5-trichlorophenyl, and pentachlorophenyl groups, particularly preferable examples include fluoroalkyl and fluoroaryl groups; and even more preferable examples include trifluoromethyl, 2,2,2-trifluoro-1-trifluoromethylethyl, 1,1-bis(trifluoromethyl)-2,2,2-trifluoroethyl, 3,5-difluorophenyl, 3,4,5-trifluorophenyl and pentafluorophenyl groups.

$R^7$ in the general formula [6] represents a hydrocarbyl group or a halogenated hydrocarbyl group. The hydrocarbyl group in $R^7$ is preferably an alkyl group, an aryl group or an aralkyl group, and the same hydrocarbyl group as that explained as $L^2$ in the general formula [4] is used. Examples of the halogenated hydrocarbyl group in $R^7$ include a halogenated alkyl group, a halogenated aryl group, a (halogenated alkyl)aryl group and the like, and the same halogenated alkyl group, halogenated aryl group and (halogenated alkyl) aryl group as those exemplified as an example of the electron withdrawing group in $R^6$ in the general formula [5] are used.

$R^7$ in the general formula [6] is preferably a halogenated hydrocarbyl group, and further preferably a fluorinated hydrocarbyl group.

Examples of the compound (a) used for obtaining the modified particle (I), when $M^2$ is a zinc atom, include dialkylzinc such as dimethylzinc, diethylzinc, dipropylzinc, di-n-butylzinc, diisobutylzinc, di-n-hexylzinc and the like, diarylzinc such as diphenylzinc, dinaphthylzinc, and bis(pentafluorophenyl)zinc, dialkenylzinc such as diallylzinc and the like, bis(cyclopentadienyl)zinc, halogenated alkylzinc such as methylzinc chloride, ethylzinc chloride, propylzinc chloride, n-butylzinc chloride, isobutylzinc chloride, n-hexylzinc chloride, methylzinc bromide, ethylzinc bromide, propylzinc bromide, n-butylzinc bromide, isobutylzinc bromide, n-hexylzinc bromide, methylzinc iodide, ethylzinc iodide, propylzinc iodide, n-butylzinc iodide, isobutylzinc iodide, and n-hexylzinc iodide, and halogenated zinc such as zinc fluoride, zinc chloride, zinc bromide, and zinc iodide.

The compound (a) is preferably dialkylzinc, further preferably dimethylzinc, diethylzinc, dipropylzinc, di-n-butylzinc, diisobutylzinc or di-n-hexylzinc, and particularly preferably dimethylzinc, or diethylzinc.

Examples of the compound (b) include, as amines, di(fluoromethyl)amine, di(chloromethyl)amine, di(bromomethyl)amine, di(iodomethyl)amine, bis(difluoromethyl)amine, bis(dichloromethyl)amine, bis(dibromomethyl)amine, bis(diiodomethyl)amine, bis(trifluoromethyl)amine, bis(trichloromethyl)amine, bis(tribromomethyl)amine, bis(triiodomethyl)amine, bis(2,2,2-trifluoroethyl)amine, bis(2,2,2-trichloroethyl)amine, bis(2,2,2-tribromoethyl)amine, bis(2,2,2-triiodoethyl)amine, bis(2,2,3,3,3-pentafluoropropyl)amine, bis(2,2,3,3,3-pentachloropropyl)amine, bis(2,2,3,3,3-pentabromopropyl)amine, bis(2,2,3,3,3-pentaiodopropyl)amine, bis(2,2,2-trifluoro-1-trifluoromethylethyl)amine, bis(2,2,2-trichloro-1 trichloromethylethyl)amine, bis(2,2,2-tribromo-1-tribromomethylethyl)amine, bis(2,2,2-triiodo-1-triiodomethylethyl)amine, bis(1,1-bis(trifluoromethyl)-2,2,2-trifluoroethyl)amine, bis(1,1-bis(trichloromethyl)-2,2,2-trichloroethyl)amine, bis(1,1-bis(tribromomethyl)-2,2,2-tribromoethyl)amine, bis(1,1-bis(triiodomethyl)-2,2,2-triiodoethyl)amine, bis(2-fluorophenyl)amine, bis(3-fluorophenyl)amine, bis(4-fluorophenyl)amine, bis(2-chlorophenyl)amine, bis(3-chlorophenyl)amine, bis(4-chlorophenyl)amine, bis(2-bromophenyl)amine, bis(3-bromophenyl)amine, bis(4-bromophenyl)amine, bis(2-iodophenyl)amine, bis(3-iodophenyl)amine, bis(4-iodophenyl)amine, bis(2,6-difluorophenyl)amine, bis(3,5-difluorophenyl)amine, bis(2,6-dichlorophenyl)amine, bis(3,5-dichlorophenyl)amine, bis(2,6-dibromophenyl)amine, bis(3,5-dibromophenyl)amine, bis(2,6-diiodophenyl)amine, bis(3,5-diiodophenyl)amine, bis(2,4,6-trifluorophenyl)amine, bis(2,4,6-trichlorophenyl)amine, bis(2,4,6-tribromophenyl)amine, bis(2,4,6-triiodophenyl)amine, bis(3,4,5-trifluorophenyl)amine, bis(3,4,5-trichlorophenyl)amine, bis(3,4,5-tribromophenyl)amine, bis(3,4,5-triiodophenyl)amine, bis(pentafluorophenyl)amine, bis(pentachorophenyl)amine, bis(pentabromophenyl)amine, bis(pentaiodophenyl)amine, bis(2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(3,4,5-tri(trifluoromethyl)phenyl)amine, bis(2-cyanophenyl)amine, (3-cyanophenyl)amine, bis(4-cyanophenyl)amine, bis(2-nitrophenyl)amine, bis(3-nitrophenyl)amine, bis(4-nitrophenyl)amine and the like. Phosphine compounds obtained by replacing a nitorgen atom with a phosphorus atom are also included in the examples of the compound (b). These phosphine compounds are compounds represented by replacing the term "amine" of the above-mentioned examples with "phosphine".

Examples of alcohols as the compound (b) include fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 2,2,3,3,3-pentafluoropropanol, 2,2,3,3,3-pentachloropropanol, 2,2,3,3,3-pentabromopropanol, 2,2,3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1-bis(trifluoromethyl)-2,2,2-triiluoroethanol, 1,1-bis(trichloromethyl)-2,2,2-trichloroethanol, 1,1-bis(tribromomethyl)-2,2,2-tribromoethanol, 1,1-bis(triiodomethyl)-2,2,2-triiodoethanol and the like. Examples of the compound (b) also include thiol compounds obtained by replacing an oxygen atom with a sulfur atom. These thiol compounds are compounds represented by replacing the terms "methanol", "ethanol", and "propanol" of above-mentioned examples with "methane thiol", "ethane thiol", and "propane thiol", respectively.

Examples of phenols of the compound (b) include 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol, perfluoro-1-naphthol, perfluoro-2-naphthol, 2-chlorophenol, 3-chlorophenol, 4-chlorophenol, 2,4-dichlorophenol, 2,6-dichlorophenol, 3,4-dichlorophenol, 3,5-dichlorophenol, 2,4,6-trichlorophenol, 3,4,5-trichlorophenol, 2,3,5,6-tetrachlorophenol, pentachlorophenol, 2,3,5,6-tetrachloro-4-trichloromethylphenol, 2,3,5,6-tetrachloro-4-pentachlorophenylphenol, perchloro-1-naphthol, perchloro-2-naphthol, 2-bromophenol, 3-bromophenol, 4-bromophenol, 2,4-dibromophenol, 2,6-dibromophenol, 3,4-dibromophenol, 3,5-dibromophenol, 2,4,6-tribromophenol, 3,4,5-tribromophenol, 2,3,5,6-tetrabromophenol, pentabromophenol, 2,3,5,6-tetrabromo-4-tribromomethylphenol, 2,3,5,6-tetrabromo-4-pentabromophenylphenol, perbromo-1-naphthol, perbromo-2-naphthol, 2-iodophenol, 3-iodophenol, 4-iodophenol, 2,4-diiodophenol, 2,6-diiodophenol, 3,4-diiodophenol, 3,5-diiodophenol, 2,4,6-triiodophenol, 3,4,5-triiodophenol, 2,3,5,6-tetraiodophenol, pentaiodophenol, 2,3,5,6-tetraiodo-4-triiodomethylphenol, 2,3,5,6-tetraiodo-4-pentaiodophenylphenol, periodo-1-naphthol, periodo-2-naphthol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 3,4,5-tris(trifluoromethyl) phenol, 2-cyanophenol, 3-cyanophenol, 4-cyanophenol, 2-nitrophenol, 3-nitrophenol, 4-nitrophenol and the like. Examples of the compound (b) also include thiol compounds obtained by replacing an oxygen atom with a sulfur atom. These thiophenol compounds are compounds represented by replacing the phenol of above-mentioned examples with thiophenol.

Preferable examples of the compound (b) include, as amines, bis(trifluoromethyl)amine, bis(2,2,2-trifluoroethyl) amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine, and bis(pentafluorophenyl)amine; as alcohols, trifluoromethanol, 2,2,2-trifluoroethanol, 2,2,3,3,3-pentafluoropropanol, 2,2,2-trifluoro-1-trifluoromethylethanol, or 1,1-bis(trifluoromethyl)-2,2,2-trifluoroethanol; as phenols, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, or 3,4,5-tris(trifluoromethyl)phenol.

More preferable examples of the compound (b) include bis(trifluoromethyl)amine, bis(pentafluorophenyl)amine, trifluoromethanol, 2,2,2-trifluoro-1-trifluoromethylethanol, 1,1-bis(trifluoromethyl)-2,2,2-trifluoroethanol, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol, and 2,4,6-tris(trifluoromethyl)phenol, and further preferable examples include 3,5-difluorophenol, 3,4,5-trifluorophenol, pentafluorophenol, and 1,1-bis(trifluoromethyl)-2,2,2-trifluoroethanol.

Examples of the compound (c) include water, hydrogen sulfide, amine, and an aniline compound. Examples of the amine include alkylamine such as methylamine, ethylamine, n-propylamine, isopropylamine, n-butylamine, sec-butylamine, tert-butylamine, isobutylamine, n-pentylamine, neopentylamine, isopentylamine, n-hexylamine, n-octylamine, n-decylamine, n-dodecylamine, n-pentadecylamine, n-eicosylamine and the like; aralkylamine such as allylamine, cyclopentadienylamine, benzylamine and the like; halogenated alkylamine such as fluoromethylamine, difluoromethylamine, trifluoromethylamine, 2,2,2-trifluoroethylamine, 2,2,3,3,3-pentafluoropropylamine, 2,2,2-trifluoro-1-trifluoromethylethylamine, 1,1-bis(trifluoromethyl)-2,2,2-trifluoroethylamine, perfluoropropylamine, perfluorobutylamine, perfluoropentylamine, perfluorohexylamine, perfluorooctylamine, perfluorododecylamine, perfluoropentadecylamine, perfluoroeicosylamine, and compounds named by replacing "fluoro" in the names of these amine compounds with "chloro", "bromo" or "iodo".

Examples of the aniline compound of the compound (c) include aniline, naphthylamine, anthracenylamine, 2-tolylamine, 3-tolylamine, 4-tolylamine, 2,3-xylylamine, 2,4-xylylamine, 2,5-xylylamine, 2,6-xylylamine, 3,4-xylylamine, 3,5-xylylamine, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, 2-ethylaniline, 3-ethylaniline, 4-ethylaniline, 2,3-diethylaniline, 2,4-diethylaniline, 2,5-diethylaniline, 2,6-diethylaniline, 3,4-diethylaniline, 3,5-diethylaniline, 2,3,4-triethylaniline, 2,3,5-triethylaniline, 2,3,6-triethylaniline, 2,4,6-triethylaniline, 3,4,5-triethylaniline, 2,3,4,5-tetraethylaniline, 2,3,4,6-tetraethylaniline, 2,3,5,6-tetraethylaniline, pentaethylaniline, and alkylaniline compounds named by replacing "ethyl" in the names of these aniline compounds with "n-propyl", "isopropyl", "n-butyl", "sec-butyl", "tert-butyl", "n-pentyl", "neopentyl", "n-hexyl", "n-octyl", "n-decyl", "n-dodecyl", and "n-tetradecyl"; halogenated aniline such as 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, and pentafluoroaniline; 2-(trifluoromethyl)aniline, 3-(trifluoromethyl)aniline, 4-(trifluoromethyl)aniline, 2,6-di(trifluoromethyl)aniline, 3,5-di(trifluoromethyl)aniline, 2,4,6-tri(trifluoromethyl) aniline, and (halogenated alkyl)aniline compounds named by replacing "fluoro" in the above-mentioned (fluoroalkyl)aniline compounds with "chloro", "bromo" and "iodo".

Preferable examples of the compound (c) include water, hydrogen sulfide, methylamine, ethylamine, n-propylamine, isopropylamine, n-butylamine, sec-butylamine, tert-butylamine, isobutylamine, n-octylamine, aniline, 2,6-xylylamine, 2,4,6-trimethylaniline, naphthylamine, anthracenylamine, benzylamine, trifluoromethylamine, pentafluoroethylamine, perfluoropropylamine, perfluorobutylamine, perfluoropentylamine, perfluorohexylamine, perfluorooctylamine, perfluorododecylamine, perfluoropentadecylamine, perfluoroeicosylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline and 2,4,6-tris(trifluoromethyl)aniline; and particularly preferable examples include water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, and 2,4,6-tris(trifluoromethyl)aniline; and most preferable examples include water and pentafluoroaniline.

Examples of (d) include an inorganic oxide particle and an organic polymer particle and, among them, preferable is a porous particle having a uniform particle diameter, which is generally used as a carrier. From a view point of a particle diameter distribution of the resulting addition polymer, a particle diameter distribution of (d) is such that a geometry standard deviation of a particle diameter of (d) based on a volume is 2.5 or less, more preferably 2.0 or less, and further preferably 1.7 or less.

As the inorganic oxide particle of (d), any inorganic oxide may be used, and a plurality of inorganic substances may be used by mixing them. Examples of the inorganic oxide include $SiO_2$, $Al_2O_3$, MgO, $ZrO_2$, $TiO_2$, $B_2O_3$, CaO, ZnO, BaO, and $ThO_2$, as well as a mixture of them, $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO. As these inorganic oxides, preferable is $SiO_2$ and/or $Al_2O_3$, and particularly preferable is $SiO_2$ (i.e. silica). The inorganic oxides may contain a small amount of carbonate, sulfate, nitrate or an oxide component such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NOs)_2$, $Al(NO_3)_3$, $Na_2O$, $K_2O$, $Li_2O$ and the like.

It is preferable that the inorganic oxide has been dried to substantially completely remove water, and a drying method is preferably heat drying. The drying temperature, to be used for an inorganic oxide containing water that cannot be confirmed visually is usually a temperature of 100 to 1500° C., preferably 100 to 1000° C., and further preferably 200 to 800° C. A drying time is not particularly limited, but is preferably 10 minutes to 50 hours, and more preferably 1 hour to 30 hours. Examples of a method of heat-drying the inorganic oxide include a method of drying the inorganic oxide by flowing a dried inert gas (e.g. nitrogen or argon) at a constant flow rate during heating, or a method of heat-drying the inorganic oxide under a reduced pressure.

Generally, hydroxy group is produced and exists on the surface of the inorganic oxide and as the inorganic oxide, a modified inorganic oxide obtained by replacing the active hydrogen of the hydroxy group on the surface with various kinds of substituent groups may be used. Examples of the modified inorganic oxide include inorganic oxides subjected to contact treatment with trialkylchlorosilane such as trimethylchlorosilane and tert-butyldimethylchlorosilane; triarylchlorosilane such as triphenylchlorosilane; dialkyldichlorosilane such as dimethyldichlorosilane; diaryldichlorosilane such as diphenyldichlorosilane; alkyltrichlorosilane such as methyltrichlorosilane; aryltrichlorosilane such as phenyltrichlorosilane; trialkylalkoxysilane such as trimethylmethoxysilane; triarylalkoxysilane such as triphenylmethoxysilane; dialkyldialkoxysilane such as dimethyldimethoxysilane; diaryldialkoxysilane such as diphenyldimethoxysilane; alkyltrialkoxysilane such as methyltrimethoxysilane; aryltrialkoxysilane such as phenyltrimethoxysilane; tetraalkoxysilane such as tetramethoxysilane; alkyldisilazane such as 1,1,1,3,3,3-hexamethyldisilazane; tetrachlorosilane; alcohol such as methanol and ethanol; phenol; dialkylmagnesium such as dibutylmagnesium, butylethylmagnesium, butyloctylmagnesium; alkyllithium such as butyllithium.

Further examples include an inorganic oxide obtained by contact-treating the inorganic oxide which has been contacted with trialkylalminum, with dialkylamine such as diethylamine, diphenylamine and the like, an alcohol such as methanol, ethanol and the like, or phenol.

In the inorganic oxide, by hydrogen bonding of hydroxy groups, a strength of the inorganic oxide itself has been enhanced in some cases. In that case, if all active hydrogens of a surface hydroxy group have been substituted with a variety of substituents, a reduction in a particle strength or the like is caused in some cases. Therefore, it is not necessarily required to substitute all active hydrogens of a surface hydroxy group of the inorganic oxide, and a substitution rate of the surface hydroxy group may be appropriately determined. A method of changing the substitution rate of the surface hydroxy group is not particularly limited. Examples of the method include a method of changing a use amount of a compound used in contact treatment.

An average particle diameter of the inorganic oxide particle is not particularly limited, but is usually 1 to 5000 μm, preferably 5 to 1000 μm, more preferably 10 to 500 μm, and further preferably 10 to 100 μm. A pore volume is preferably 0.1 ml/g or more, and more preferably 0.3 to 10 ml/g. A specific surface area is preferably 10 to 1000 $m^2$/g, and more preferably 100 to 500 $m^2$/g.

As the organic polymer particle of (d), any organic polymer may be used, and a mixture of organic polymers may be used. The organic polymer is preferably a polymer having a functional group having active hydrogen or a non-proton donating Lewis basic functional group.

The functional group having active hydrogen is not particularly limited if it has active hydrogen. Examples of the functional group include primary amino, secondary amino, imino, amido, hydrazido, amidino, hydroxy, hydroperoxy, carboxyl, formyl, carbamoyl, sulfonic acid, sulfinic acid, sulfenic acid, thiol, thioformyl, pyrrolyl, imidazolyl, piperidyl, indazolyl, carbazolyl groups and the like. Preferable examples include primary amino, secondary amino, imino, amido, imido, hydroxy, formyl, carboxyl, sulfonic acid, and thiol groups; and particularly preferable examples include primary amino, secondary amino, amido, and hydroxyl groups. These groups may be substituted with halogen atoms or the hydrocarbyl group having 1 to 20 carbon atoms.

The non-proton donating Lewis basic functional group is not particularly limited if it is a functional group having a Lewis base portion having no active hydrogen atom. Examples of the functional group include pyridyl, N-substituted imidazolyl, N-substituted indazolyl, nitryl, azido, N-substituted imino, N,N-substituted amino, N,N-substituted aminooxy, N,N,N-substituted hydrazido, nitroso, nitro, nitroxy, furyl, carbonyl, thiocarbonyl, alkoxy, alkyloxycarbonyl, N,N-substituted carbamoyl, thioalkoxy, substituted sulfinyl, substituted sulfonyl, and substituted sulfonic acid groups. Preferable examples include a heterocyclic ring group and more preferable examples include an aromatic heterocyclic ring group having an oxygen atom and/or a nitrogen atom in the ring. Especially preferable examples include pyridyl, N-substituted imidazolyl, and N-substituted indazolyl groups and most preferable examples include pyridyl group. These groups may be substituted with halogen atoms or the hydrocarbyl group having 1 to 20 carbon atoms.

The content of the functional group having active hydrogen or the non-proton donating Lewis basic functional group in the organic polymer is not particularly limited. The content is preferably 0.01 to 50 mmol/g, and more preferably 0.1 to 20 mmol/g, expressed by the molar number of functional groups per 1 gram of the organic polymer.

Examples of a process for producing the organic polymer having a functional group having active hydrogen or a non-proton donating Lewis basic functional group include a method of homopolymerizing a monomer having a functional group having active hydrogen or a non-proton donating Lewis basic functional group and one or more polymerizable unsaturated groups, or a method of copolymerizing the monomer and other monomer having a polymerizable unsaturated group. It is preferable that, thereupon, a crosslinking polymerizable monomer having two or more polymerizable unsaturated groups is further copolymerized together.

Examples of the polymerizable unsaturated group include an alkenyl group such as a vinyl group, an allyl group and the like, and an alkynyl group, such as ethyne group and the like. Examples of the monomer having a functional group having active hydrogen and one or more polymerizable unsaturated groups include a vinyl group-containing primary amine, a vinyl group-containing secondary amine, a vinyl group-containing amide compound, and a vinyl group-containing hydroxy compound. Examples of the monomer include N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl)amide, N-methyl-(2-propenyl)amide, vinyl alcohol, 2-propene-1-ol, and 3-butene-1-ol. Examples of the monomer having a functional group with a Lewis base part free of active hydrogen atom and also having one or more polymerizable unsaturated groups include vinylpyridine, vinyl(N-substituted)imidazole, and vinyl(N-substituted)indazole.

Examples of other monomer having a polymerizable unsaturated group include ethylene, α-olefin, an aromatic vinyl compound and a cyclic olefin compound. Examples of the monomer include ethylene, propylene, 1-butene, 1-hexene, 4-methyl-1-pentene, styrene, norbornene, and dicyclopentadiene. Preferable is ethylene or styrene. Two or more kinds of these monomers may be used. Examples of the crosslinking polymerizable monomer having two or more polymerizable unsaturated groups include divinylbenzene and the like.

An average particle diameter of the organic polymer particle is not particularly limited, but is usually 1 to 5000 µm, preferably 5 to 1000 µm, and more preferably 10 to 500 µm. A pore volume is not particularly limited, but is preferably 0.1 ml/g or more, and more preferably 0.3 to 10 ml/g. A specific surface area is not particularly limited, but is preferably 10 to 1000 m$^2$/g, and more preferably 50 to 500 m$^2$/g.

It is preferable that these organic polymer particles have been dried to substantially remove water, and organic polymer particles which have been dried by heat drying are preferable. The drying temperature, to be used for an organic polymer containing water that cannot be confirmed visually is usually 30 to 400° C., preferably 50 to 200° C., and further preferably 70 to 150° C. A heating time is not particularly limited, but preferably 10 minutes to 50 hours, and more preferably 1 hour to 30 hours. Examples of a method of heat-drying the organic polymer particle include a method of drying the organic polymer by flowing a dried inert gas (e.g. nitrogen or argon) at a constant flow rate while the organic polymer is heated or a method of heat-drying the organic polymer particle under reduced pressure.

An order of contacting the components (a), (b), (c), and (d) for obtaining the modified particle (I) of the present invention is not particularly limited, but examples include the following orders.

<1> A contact product obtained by bringing a contact product of (a) and (b) into contact with (c) is brought into contact with (d).
<2> A contact product obtained by bringing a contact product of (a) and (b) into contact with (d) is brought into contact with (c).
<3> A contact product obtained by bringing a contact product of (a) and (c) into contact with (b) is brought into contact with (d).
<4> A contact product obtained by bringing a contact product of (a) and (c) into contact with (d) is brought into contact with (b).
<5> A contact product obtained by bringing a contact product of (a) and (d) into contact with (b) is brought into contact with (c).
<6> A contact product obtained by bringing a contact product of (a) and (d) into contact with (c) is brought into contact with (b).
<7> A contact product obtained by bringing a contact product of (b) and (c) into contact with (a) is brought into contact with (d).
<8> A contact product obtained by bringing a contact product of (b) and (c) into contact with (d) is brought into contact with (a).
<9> A contact product obtained by bringing a contact product of (b) and (d) into contact with (a) is brought into contact with (c).
<10> A contact product obtained by bringing a contact product of (b) and (d) into contact with (c) is brought into contact with (a).
<11> A contact product obtained by bringing a contact product of (c) and (d) into contact with (a) is brought into contact with (b).
<12> A contact product obtained by bringing a contact product of (c) and (d) into contact with (b) is brought into contact with (a).

A contacting order is preferably the <1>, <2>, <3>, <5>, <11> or <12>. Particularly preferable is <2> or <5>.

It is preferable that such the contacting treatment is performed under the inert gas atmosphere. A treating temperature is usually −100 to 300° C., and preferably −80 to 200° C. A treating time is usually 1 minute to 200 hours, and preferably 10 minutes to 100 hours. In such the treatment, a solvent may be used, or these compounds may be directly subjected to contacting treatment without using a solvent.

As a solvent, a solvent which is inert to the compounds (a), (b), (c), (d), and a contact product of them is used. However, when each compound is contacted step-wisely as described above, even if a solvent which reacts with a certain compound at a certain stage is a solvent which does not react with each compound at other stage, the solvent can be used at other stage. That is, solvents at respective stages may be the same, or different from each other. Examples of the solvent include non-polar solvents such as aliphatic hydrocarbon solvents and aromatic hydrocarbon solvents; and polar solvents such as halogenated solvents, ether type solvents, alcohol type solvents, phenol type solvents, carbonyl type solvents, phosphoric acid derivatives, nitrile type solvents, nitro compounds, amine type solvents, and sulfur compounds. Eexamples include aliphatic hydrocarbon solvents such as butane, pentane, hexane, heptane, octane, 2,2,4-trimethylpentane, and cyclohexane; aromatic hydrocarbon solvents such as benzene, toluene, and xylene; halogenated solvents such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene, and o-dichlorobenzene; ether type solvents such as dimethyl ether, diethyl ether, diisopropyl ether, di-n-butyl ether, methyl-tert-butyl-ether, anisol, 1,4-dioxane, 1,2-dimethoxyethane, bis(2-methoxyethyl)ether, tetrahydrofuran, and tetrahydropyran; alcohol type solvents such as methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, and glycerin; phenol type solvents such as phenol and p-cresol; carbonyl type solvents such as acetone, ethyl methyl ketone, cyclohexanone, acetic anhydride, ethyl acetate, butyl acetate, ethylene carbonate, propylene carbonate, N,N-dimethylformamide, N,N-dimethylacetamide, and N-methyl-2-pyrrolidone; phosphoric acid derivatives such as hexamethylphosphoric acid triamide and triethyl phosphate; nitrile type solvents such as acetonitrile, propionitrile, succinonitrile, and benzonitrile; nitro compounds such as nitromethane and nitrobenzene; amine type solvents such as pyridine, piperidine, and morphorine; and sulfur compounds such as dimethyl sulfoxide and sulfolane.

A solvent (s1) when a contact product (f) obtained by bringing compounds (a), (b) and (c) into contact with one another is brought into contact with a particle (d), that is, when a contact product (f) is produced in each method of the <1>, <3> and <7> is preferably the aforementioned aliphatic hydrocarbon solvent, aromatic hydrocarbon solvent or ether solvent.

As a solvent (s2) when a contact product (0 and a particle (d) are brougt into contact with each other, a polar solvent is preferable. As an index representing polarity of a solvent, an $E_T^N$ value (C. Reichardt, "Solvents and Solvents Effects in Organic Chemistry", 2nd ed., VCH Verlag (1988).) or the like is known, and a solvent satisfying a range of $0.8 \geq E_T^N \geq 0.1$ is particularly preferable. Examples of the polar solvents include dichloromethane, dichlorodifluoromethanechloroform, 1,2-dichloroethane, 1,2-dibromoethane, 1,1,2-trichloro-1,2,2-trifluoroethane, tetrachloroethylene, chlorobenzene, bromobenzene, o-dichlorobenzene, dimethyl ether, diethyl ether, diisopropyl ether, di-n-butyl ether, methyl-tert-butyl ether, anisol, 1,4-dioxane, 1,2-dimethoxyethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, acetone, ethylmethylketone, cyclohexanone, acetic anhydride, ethyl acetate, butyl acetate, ethylene carbonate, propylene carbonate, N,N-dimethylformamide, N,N-dimethylacetamide, N-methyl-2-pyrrolidone, hexamethylphosphoric acid triamide, phosphoric acid triethyl, acetonitrile, propionitrile, succinonitrile, benzonitrile, nitromethane, nitrobenzene, ethylenediamine, pyridine, piperidine, morphorine, dimethyl sulfoxide, and sulfolane. Further preferable examples as the solvent (s2) include dimethyl ether, diethyl ether, diisopropyl ether, di-n-butyl ether, methyl-tert-butyl ether, anisol, 1,4-dioxane, 1,2-dimethoxyethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, and triethylene glycol; particularly preferable examples include di-n-butyl ether, methyl-tert-butyl ether, 1,4-dioxane, tetrahydrofuran, methanol, ethanol, 1-propanol, 2-propanol, 1-butanol, 2-butanol, 2-methyl-1-propanol, 3-methyl-1-butanol, and cyclohexanol, and most preferable examples include tetrahydrofuran, methanol, ethanol, 1-propanol and 2-propanol.

As the solvent (s2), a mixed solvent of these polar solvent and hydrocarbon solvent can be also used. As the hydrocarbon solvent, the aliphatic hydrocarbon solvent and the aromatic hydrocarbon solvent exemplified above are used. Examples of the mixed solvent of the polar solvent and the hydrocarbon solvent include a hexane/methanol mixed solvent, a hexane/ethanol mixed solvent, a hexane/1-propanol mixed solvent, a hexane/2-propanol mixed solvent, a heptane/methanol mixed solvent, a heptane/ethanol mixed solvent, a heptane/1-propanol mixed solvent, a heptane/2-propanol mixed solvent, a toluene/methanol mixed solvent, a toluene/ethanol mixed solvent, a toluene/1-propanol mixed solvent, a toluene/2-propanol mixed solvent, a xylene/methanol mixed solvent, a xylene/ethanol mixed solvent, a xylene/1-propanol mixed solvent, and a xylene/2-propanol mixed solvent. Preferable is a hexane/methanol mixed solvent, a hexane/ethanol mixed solvent, a heptane/methanol mixed solvent, a heptane/ethanol mixed solvent, a toluene/methanol mixed solvent, a toluene/ethanol mixed solvent, a xylene/methanol mixed solvent, and a xylene/ethanol mixed solvent. Further preferable is a hexane/methanol mixed solvent, a hexane/ethanol mixed solvent, a toluene/methanol mixed solvent and a toluene/ethanol mixed solvent. A most preferable is a toluene/ethanol mixed solvent. A preferable range of an ethanol fraction in the toluene/ethanol mixed solvent is 10 to 50% by volume, and further preferably 15 to 30% by volume.

In a method of bringing a contact product (f) obtained by bringing the compounds (a), (b) and (c) into contact with one another, into contact with (d), that is, in each method of the <1>, <3> and <7>, as the solvent (s1) and the solvent (s2), a hydrocarbon solvent can be also used as both solvents. In this case, it is preferable that the time to be taken after the contact of compounds (a), (b) and (c) and until the contact of the resulting contact product (f) with a particle (d) is shorter. The time is preferably 0 to 5 hours, further preferably 0 to 3 hours, and most preferably 0 to 1 hour. The temperature at which a contact product (f) and a particle (d) are brought into contact is usually −100° C. to 40° C., preferably −20° C. to 20° C., and most preferably −10° C. to 10° C.

In the case of the <2>, <5>, <6>, <8>, <9>, <10>, <11> and <12>, any of the nonpolar solvent and the polar solvent can be used. Preferable is the nonpolar solvent. The reason is that since a contact product of (a) and (c), or a contact product obtained by bringing a contact product of (a) and (b) into contact with (c) is generally low in solubility in the nonpolar solvent, it is thought that when (d) is present in a reaction system at generation of these contact products, the generated contact product is precipitated and more easily immobilized on a surface of (d).

A use amount of each compound of the (a), (b) and (c) is not particularly limited. It is preferable that y and z substantially satisfy the following equation (1), letting a mole ratio of a use amount of each compound to be a mole ratio of (a):(b):(c)=1:y:z.

$$|m-y-2z|<1 \quad (1)$$

(in the equation (1), m represents a valence of $M^3$)

And, y in the equation (1) is preferably a number of 0.01 to 1.99, more preferably a number of 0.10 to 1.80, further preferably a number of 0.20 to 1.50, and most preferably a number of 0.30 to 1.00, and a similar preferable range of z in the equation (1) is determined by m, y and the equation (1).

A use amount of the compounds (a) and (d) is such an amount that a main group metal atom derived from the compound (a) contained in a modified particle (I) is preferably 0.05 mmol or more, and more preferably 0.1 to 20 mmol, relative to a mole number of a main group metal atom contained in 1 g of the resulting modified particle (I).

In order to progress a reaction more rapidly, it is preferable to add a heating step at a higher temperature after the aforementioned contacting treatment. In the heating step, in order to realize a higher temperature, it is preferable to use a solvent having a high boiling point, and a solvent used in the contact step may be replaced with other solvent having a higher boiling point, upon the heating step.

In the modified particle (I), as a result of such a contacting treatment, compounds (a), (b), (c) and/or (d) each of which is a raw material may remain unreacted. However, it is preferable to wash the resulting modified particle (I) in order to remove the unreacted compounds from the resulting modified particle (I). The solvent to be used when the modified particle (I) is washed may be the same as or different from the solvent used when the modified particle (I) is produced. It is preferable to wash the modified particle (I) under the inert gas atmosphere. The washing temperature is usually −100 to 300° C., and preferably −80 to 200° C. The washing time is usually 1 minute to 200 hours, and preferably 10 minutes to 100 hours.

And, it is preferable for obtaining the modified particle (I) having a uniform particle diameter or shape to remove a solvent at an upper part, in the state where the modified particle (I) in a solvent is settled, and an indeterminate form or fine powder particle is suspended in the upper part of a slurry, upon the washing treatment.

It is preferable that, after such contacting treatment and washing treatment, the solvent is distilled off from the product and, thereafter, drying is performed at a temperature of 0° C. or higher for 1 hour to 24 hours under reduced pressure. More preferable is 1 hour to 24 hours at a temperature of 0° C. to 200° C., further preferable is 1 hour to 24 hours at a temperature of 10° C. to 200° C., particularly preferable is 2 hours to 18 hours at a temperature of 10° C. to 160° C., and most preferable is 4 hours to 18 hours at a temperature of 15° C. to 160° C.

A specific example of the method for producing the modified particle (I) is described in detail below by taking a case as an example in which case M³ is a zinc atom, the compound (b) is 3,4,5-trifluorophenol, the compound (c) is water, and (d) is silica. A hexane solution of diethylzinc is added into a solvent of tetrahydrofuran, this is cooled to 3° C., 3,4,5-trifluorophenol at an equal mole amount relative to diethylzinc is added dropwise thereto, the mixture is stirred at room temperature for 10 minutes to 24 hours, further, water at a mole amount which is 0.5-fold to diethylzinc is added dropwise, and the mixture is stirred at room temperature for 10 minutes to 24 hours. Thereafter, the solvent is distilled off, and drying is performed at 120° C. for 8 hours under reduced pressure. To a solid component obtained by the above manipulation are added tetrahydrofuran and silica, and the mixture is stirred at 40° C. for 2 hours. After the solid component is washed with tetrahydrofuran, drying is performed at 120° C. for 8 hours under reduced pressure. Thus, the modified particle (I) of the present invention can be produced.

As aluminoxane (e) used in preparation of the modified particle (II), cyclic aluminoxane having a structure represented by the general formula $\{-Al(E^1)-O-\}_c$ and/or linear aluminoxane having a structure represented by the general formula $E^2\{-Al(E^2)-O-\}_dAlE^2_2$ (provided that, $E^1$ and $E^2$ each are a hydrocarbyl group, and all $E^1$ groups and all $E^2$ groups may be the same or different, and, c represents a number of 2 or more, and d represents a number of 1 or more) are preferably used.

As the hydrocarbyl group of $E^1$ or $E^2$, a hydrocarbyl group having 1 to 8 carbon atoms is preferable, and an alkyl group is more preferable.

As an example of $E^1$ and $E^2$, an alkyl group such as a methyl group, an ethyl group, a normalpropyl group, an isopropyl group, a normalbutyl group, an isobutyl group, a normalpentyl group, a neopentyl group and the like can be exemplified. And, c is a number of 2 or more, and d is a number of 1 or more. Preferably, $E^1$ and $E^2$ are a methyl group or an isobutyl group, c is 2 to 40, and d is 1 to 40.

The aluminoxane is made by various methods. The method is not particularly limited, but the aluminoxane may be made in accordance with the known method. The examples of method for producing the aluminoxane include a method of bringing a solution obtained by dissolving trialkylaluminum (e.g. trimethylaluminum etc.) in a suitable organic solvent (benzene, aliphatic hydrocarbyl etc.), into contact with water, and a method of bringing trialkylaluminum (e.g. trimethylaluminum etc.) into contact with a metal salt (e.g. copper sulfate hydrate etc.) containing crystal water. It is thought that aluminoxane obtained by such a method is usually a mixture of cyclic aluminoxane and linear aluminoxane.

A particle (d) used for obtaining the modified particle (II) is the same particle as (d) used in the modified particle (I).

The modified particle (II) can be produced by bringing aluminoxane (e) and a particle (d) into contact with each other by an arbitrary method. Specifically, by dispersing the particle (d) in a solvent and adding aluminoxane (e) thereto, the modified particle (II) can be produced.

As a solvent in this case, any solvents described in the explanation of the process for producing the modified particle (I) can be used, a solvent which does not react with aluminoxane (e) is preferable, and a solvent which dissolves aluminoxane (e) is more preferable. Specifically, an aromatic hydrocarbyl solvent such as toluene and xylene, or an aliphatic hydrocarbyl solvent such as hexane, heptane and octane is preferable, and toluene or xylene is further preferable.

A temperature and a time for bringing aluminoxane (e) and the particle (d) into contact with each other can be arbitrarily determined, and a temperature is usually -100° C. to 200° C., preferably -50° C. to 150° C., and further preferably -20° C. to 120° C. Particularly, at the early stage of a reaction, in order to suppress heat production, it is preferable to react them at a low temperature. While the amount of aluminoxane (e) to be brought into contact with the particle (d) is arbitrary, the amount of aluminoxane (e) expressed by the amount of aluminum atoms per unit gram of the particle (d) is usually 0.01 to 100 mmol, preferably 0.1 to 20 mmol, and further preferably 1 to 10 mmol.

A modified particle (III) is obtained by further using a transition metal compound at preparation of the modified particle (II).

As the transition metal compound, the transition metal compound represented by the general formula [3] or a μ-oxo type transition metal compound dimer thereof (A) is used.

The modified particle (III) can be obtained by bringing aluminoxane (e), a particle (d) and a transition metal compound into contact with one another by an arbitrary method. It is preferable to use a solvent when aluminoxane (e), the particle (d) and the transition metal compound are brought into contact with one another. As the solvent, any solvents described above can be used, a solvent which does not react with aluminoxane (e) and the transition metal compound is preferable, and a solvent capable of dissolving aluminoxane (e) and the transition metal compound is more preferable. Specifically, an aromatic hydrocarbyl solvent such as toluene and xylene, or an aliphatic hydrocarbyl solvent such as hexane, heptane and octane is preferable, and toluene or xylene is further preferable.

A temperature and a time for bringing aluminoxane (e), the particle (d) and the transition metal compound into contact with one another are arbitrary, and a temperature is usually -100° C. to 200° C., preferably -50° C. to 150° C., and further preferably -20° C. to 120° C. Particularly, at an initial stage of a reaction, it is preferable to react them at a low temperature in order to suppress heat production. While the amount of aluminoxane (e) to be brought into contact with the particle (d) and the amount of the transition metal compound to be brought into contact with the particle (d) are arbitrary. The amount of aluminoxane (e) expressed by the amount of the aluminum atoms per unit gram of the particle (d) in terms of an aluminum atom is usually 0.01 to 100 mmol, preferably 0.1 to 20 mmol, and further preferably 1 to 10 mmol. The amount of the transition metal compound expressed by the amount of the transition metal atoms per unit gram of the particle (d) is usually 0.1 to 1000 mol, preferably 1 to 500 mol, and further preferably 10 to 200 μmol.

(C) Organoaluminum Compound

The organoaluminum compound used in the present invention is a known organoaluminum compound. Preferable is an organoaluminum compound represented by the following general formula [9]

$$R^{10}_d AlY_{3-d} \quad [9]$$

wherein $R^{10}$ represents a hydrocarbyl group, all $R^{10}$ groups may be the same or different, Y represents a hydrogen atom, a halogen atom, an alkoxy group, an aralkyloxy group, or an aryloxy group, all Y groups may be the same or different, and, d represents a number satisfying 0<d≤3.

$R^{10}$ in the general formula [9] is preferably a hydrocarbyl group having 1 to 24 carbon atoms, and more preferably an alkyl group having 1 to 24 carbon atoms. Examples include a methyl group, an ethyl group, a n-propyl group, a n-butyl group, an isobutyl group, a n-hexyl group, a 2-methylhexyl group, a n-octyl group and the like, preferably an ethyl group, a n-butyl group, an isobutyl group, a n-hexyl group or a n-octyl group.

Examples in the case, Y is a halogen atom include a fluorine atom, a chlorine atom, a bromine atom, and an iodine atom, and a chlorine atom is preferable.

The alkoxy group having 1 to 24 carbon atoms is preferable as alkoxy group in Y and examples thereof include methoxy, ethoxy, n-propoxy, isopropoxy, n-butoxy, sec-butoxy, tert-butoxy, n-pentoxy, neopentoxy, n-hexoxy, n-octoxy, n-dodesoxy, n-pentadesoxy and n-icosoxy groups, and preferable examples include methoxy, ethoxy, and tert-butoxy groups.

The aryloxy group having 6 to 24 carbon atoms is preferable as aryloxy group in Y and examples thereof include phenoxy, 2-methylphenoxy, 3-methylphenoxy, 4-methylphenoxy, 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2,3,4-trimethylphenoxy, 2,3,5-trimethylphenoxy, 2,3,6-trimethylphenoxy, 2,4,5-trimethylphenoxy, 2,4,6-trimethylphenoxy, 3,4,5-trimethylphenoxy, 2,3,4,5-tetramethylphenoxy, 2,3,4,6-tetramethylphenoxy, 2,3,5,6-tetramethylphenoxy, pentamethylphenoxy, ethylphenoxy, n-propylphenoxy, isopropylphenoxy, n-butylphenoxy, sec-butylphenoxy, tert-butylphenoxy, n-hexylphenoxy, n-octylphenoxy, n-decylphenoxy, n-tetradecylphenoxy, naphthoxy, and anthracenoxy groups.

The aralkyloxy group having 7 to 24 carbon atoms is preferable as aralkyloxy group in Y and examples thereof include benzyloxy, (2-methylphenyl)methoxy, (3-methylphenyl)methoxy, (4-methylphenyl)methoxy, (2,3-dimethylphenyl)methoxy, (2,4-dimethylphenyl)methoxy, (2,5-dimethylphenyl)methoxy, (2,6-dimethylphenyl)methoxy, (3,4-dimethylphenyl)methoxy, (3,5-dimethylphenyl)methoxy, (2,3,4-trimethylphenyl)methoxy, (2,3,5-trimethylphenyl)methoxy, (2,3,6-trimethylphenyl)methoxy, (2,4,5-trimethylphenyl)methoxy, (2,4,6-trimethylphenyl)methoxy, (3,4,5-trimethylphenyl)methoxy, (2,3,4,5-tetramethylphenyl)methoxy, (2,3,5,6-tetramethylphenyl)methoxy, (pentamethylphenyl)methoxy, (ethylphenyl)methoxy, (n-propylphenyl)methoxy, (isopropylphenyl)methoxy, (n-butylphenyl)methoxy, (sec-butylphenyl)methoxy, (tert-butylphenyl)methoxy, (n-hexylphenyl)methoxy, (n-octylphenyl)methoxy, (n-decylphenyl)methoxy, (n-tetradecylphenyl)methoxy, naphthylmethoxy, and anthracenylmethoxy groups, and benzyloxy group is preferable.

Examples of the organoaluminum compound represented by the general formula [9] include trialkylaluminum such as trimethylaluminum, triethylaluminum, tri-n-propylaluminum, tri-n-butylaluminum, triisobutylaluminum, tri-n-hexylaluminum, and tri-n-octylaluminum; dialkylaluminum chloride such as dimethylaluminum chloride, diethylaluminum chloride, di-n-propylaluminum chloride, di-n-butylaluminum chloride, diisobutylaluminum chloride, and di-n-hexylaluminum chloride; alkylaluminum dichloride such as methylaluminum dichloride, ethylaluminum dichloride, n-propylaluminum dichloride, n-butylaluminum dichloride, isobutylaluminum dichloride, and n-hexylaluminum dichloride; dialkylaluminum hydride such as dimethylaluminum hydride, diethylaluminum hydride, di-n-propylaluminum hydride, di-n-butylaluminum hydride, diisobutylaluminum hydride, and di-n-hexylaluminum hydride; alkyl(dialkoxy)aluminum such as methyl(dimethoxy)aluminum, methyl(diethoxy)aluminum, and methyl(di-tert-butoxy)aluminum; dialkyl(alkoxy)aluminum such as dimethyl(methoxy)aluminum, dimethyl(ethoxy)aluminum, dimethyl(tert-butoxy)aluminum; alkyl(diaryloxy)aluminum such as methyl(diphenoxy)aluminum, methylbis(2,6-diisopropylphenoxy)aluminum, and methylbis(2,6-diphenylphenoxy)aluminum; dialkyl(aryloxy)aluminum such as dimethyl(phenoxy)aluminum, dimethyl(2,6-diisopropylphenoxy)aluminum, and dimethyl(2,6-diphenylphenoxy)aluminum and the like.

Among them, preferable is trialkylaluminum, further preferably trimethylaluminum, triethylaluminum, tri-n-butyl aluminum, triisobutylaluminum, tri-n-hexylaluminum or tri-n-octylaluminum, and particularly preferably triisobutylaluminum, or tri-n-octylaluminum.

One of these organoaluminum compounds may be used, or two or more the organoaluminum compounds may be used.

Electron Donating Compound (D)

Upon production of a pre-polymerized addition polymerization catalyst component and an addition polymer of the present invention, an electron donating compound (D) may be brought into contact with a catalyst or the pre-polymerized addition polymerization catalyst component. As the electron donating compound (D), a compound comprising a nitrogen atom, a phosphorus atom, an oxygen atom or a sulfur atom is preferable, examples include an oxygen-containing compound, a nitrogen-containing compound, a phosphorus-containing compound, and a sulfur-containing compound and, among them, an oxygen-containing compound or a nitrogen-containing compound is preferable. Examples of the oxygen-containing compound include alkoxysilicons, ethers, ketones, aldehydes, carboxylic acids, esters of organic acids or inorganic acids, acid amides of organic acids or inorganic acids, and acid anhydrides and the like and, among them, alkoxysilicons, or ethers are preferable. Examples of the nitrogen-containing compound include amines, nitriles, isocyanates and the like, and amines are preferable.

As the alkoxysilanes, an alkoxysilane represented by the general formula $R^{11}_r Si(OR^{13})_{4-r}$, wherein $R^{11}$ represents a hydrocarbyl group having 1 to 20 carbon atoms, a hydrogen atom or a hetero atom-containing substituent, $R^{13}$ represents a hydrocarbyl group having 1 to 20 carbon atoms, and r represents a number satisfying $0 \leq r < 4$, and, all $R^{11}$ groups and all $R^{13}$ groups may be the same or different, respectively, is preferably used.

In the case that $R^{11}$ and $R^{13}$ are hydrocarbyl groups, examples of the hydrocarbyl group include straight chain alkyl group such as methyl group, ethyl group, propyl group, butyl group, and pentyl group; branched alkyl group such as isopropyl group, sec-butyl group, tert-butyl group, and tert-amyl group; cycloalkyl group such as cyclopentyl group and cyclohexyl group; cycloalkenyl group such as cyclopentenyl group; and aryl group such as phenyl group and tolyl group. In the case that $R^{11}$ is a hetero atom-containing substituent, examples of heteroatoms include an oxygen atom, a nitrogen atom, a sulfur atom, and a phosphorus atom. Examples of the hetero atom-containing substituent include dimethylamino, methylethylamino, diethylamino, ethyl-n-propylamino, di-n-propylamino, pyrrolyl, pyridyl, pyrrolidinyl, piperidyl, perhydroindolyl, perhydroisoindolyl, perhydroquinolyl, perhydroisoquinolyl, perhydrocarbazolyl, perhydroacridinyl, furyl, pyranyl, perhydrofuryl, thienyl groups and the like. As alkoxysilicons, $R^{11}$ and $R^{13}$ are preferably an alkyl group and further, r is preferably a number satisfying $4 > r \geq 2$.

Examples of the above-mentioned alkoxysilanes include tetramethoxysilane, methyltrimethoxysilane, ethyltrimethoxysilane, normalpropyltrimethoxysilane, isopropyltrimethoxysilane, normalbutyltrimethoxysilane, isobutyltrimethoxysilane, sec-butyltrimethoxysilane, tert-butyltrimethoxysilane, normalpentyltrimethoxysilane, tert-amyltrimethoxysilane, dimethyldimethoxysilane, diethyldimethoxysilane, di-normalbutyldimethoxysilane, diisobutyldimethoxysilane, di-tert-butyldimethoxysilane, methylethyldimethoxysilane, methyl-normal-propyldimethoxysilane, methyl-normal-butyldimethoxysilane, methylisobutyldimethoxysilane, tert-butylmethyldimethoxysilane, tert-butylethyldimethoxysilane, tert-butyl-normal-propyldimethoxysilane, tert-butylisopropyldimethoxysilane, tert-butyl-normalbutyldimethoxysilane, tert-butylisobutyldimethoxysilane, tert-amylmethyldimethoxysilane, tert-amylethyldimethoxysilane, tert-amyl-normalpropyldimethoxysilane, tert-amyl-normalbutyldimethoxysilane, isobutylisopropyldimethoxysilane, dicyclobutyldimethoxysilane, cyclobutylmethyldimethoxysilane, cyclobutylethyldimethoxysilane, cyclobutylisopropyldimethoxysilane, cyclobutyl-normalbutyldimethoxysilane, cyclobutylisobutyldimethoxysilane, cyclobutyl-tert-butyldimethoxysilane, dicyclopentyldimethoxysilane, cyclopentylmethyldimethoxysilane, cyclopentyl-normalpropyldimethoxysilane, cyclopentylisopropyldimethoxysilane, cyclopentyl-normalbutyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexyl-normalpropyldimethoxysilane, cyclohexylisopropyldimethoxysilane, cyclohexyl-normalbutyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylethyldimethoxysilane, phenylnormalpropyldimethoxysilane, phenylisopropyldimethoxysilane, phenyl-normalbutyldimethoxysilane, phenylisobutyldimethoxysilane, phenyl-tert-butyldimethoxysilane, phenylcyclopentyldimethoxysilane, 2-norbornanemethyldimethoxysilane, bis(perhydroquinolino)dimethoxysilane, bis(perhydroisoquinolino)dimethoxysilane, (perhydroquinolino)(perhydroisoquinolino)dimethoxysilane, (perhydroquinolino)methyldimethoxysilane, (perhydroisoquinoline)methyldimethoxysilane, (perhydroquinolino)ethyldimethoxysilane, (perhydroisoquinolino)ethyldimethoxysilane, (perhydroquinolino)(n-propyl)dimethoxysilane, (perhydroisoquinolino)(n-propyl)dimethoxysilane, (perhydroquinolino)(tert-butyl)dimethoxysilane, (perhydroisoquinolino)(tert-butyl)dimethoxysilane, trimethylmethoxysilane, triethylmethoxysilane, tri normalpropylmethoxysilane, triisopropylmethoxysilane, trinormalbutylmethoxysilane, triisobutylmethoxysilane, tri-tert-butylmethoxysilane and the like. The examples also include compounds represented by replacing the methoxy of these compounds with ethoxy, propoxy, normalbutoxy, isobutoxy, tert-butoxy, and phenoxy. Preferable examples include dialkyldialkoxysilane and trialkylmonoalkoxysilane and trialkylmonoalkoxysilane is more preferable.

Examples of the ethers include dialkyl ether, alkylaryl ether, diaryl ether, diether compoumds, cyclic ethers, and cyclic diethers.

More specific examples of the ethers include dimethyl ether, diethyl ether, di-normalpropyl ether, diisopropyl ether, di-normalbutyl ether, diisobutyl ether, di-tert-butyl ether, dicyclohexyl ether, diphenyl ether, methylethyl ether, methyl-normalpropyl ether, methylisopropyl ether, methyl-normalbutyl ether, methylisobutyl ether, methyl-tert-butyl ether, methylcyclohexyl ether, methylphenyl ether, ethylene oxide, propylene oxide, oxetane, tetrahydrofuran, 2,5-dimethyltetrahydrofuran, tetrahydropyran, 1,2-dimethoxyethane, 1,2-diethoxyethane, 1,2-diisobutoxyethane, 2,2-dimethoxypropane, 1,3-dimethoxypropane, 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2-pentyl-1,3-dimethoxypropane, 1,2-dimethoxybenzene, 1,3-dimethoxybenzene, 1,4-dimethoxybenzene, 1,3-dioxolane, 1,4-dioxane, 1,3-dioxane and the like. Preferable examples include diethyl ether, di-normalbutyl ether, methyl-normalbutyl ether, methylphenyl ether, tetrahydrofuran, 1,3-dioxane, 1,4-dioxane, and 1,3-dioxolane, and more preferable examples include diethyl ether, di-normalbutyl ether, and tetrahydrofuran.

Examples of the carboxylic acid esters include mono- and poly-carboxylic acid esters and their examples include saturated aliphatic carboxylic acid esters, unsaturated aliphatic carboxylic acid esters, alicyclic carboxylic acid esters, and aromatic carboxylic acid esters. More specific examples of the carboxylic acid esters include methyl acetate, ethyl acetate, normalbutyl acetate, isobutyl acetate, tert-butyl acetate, phenyl acetate, methyl propionate, ethyl propionate, ethyl butyrate, ethyl valerate, ethyl acrylate, methyl methacrylate, methyl benzoate, ethyl benzoate, normalbutyl benzoate, isobutyl benzoate, tert-butyl benzoate, methyl toluate, ethyl toluate, methyl anisate, ethyl anisate, dimethyl succinate, diethyl succinate, dinormalbutyl succinate, dimethyl malonate, diethyl malonate, dinormalbutyl malonate, dimethyl maleate, dibutyl maleate, diethyl itaconate, dinormalbutyl itaconate, monoethyl phthalate, dimethyl phthalate, methylethyl phthalate, diethyl phthalate, dinormalpropyl phthalate, diisopropyl phthalate, dinormalbutyl phthalate, diisobutyl phthalate, di-tert-butyl phthalate, dipentyl phthalate, di-n-hexyl phthalate, diheptyl phthalate, dinormaloctyl phthalate, di(2-ethylhexyl)phthalate, diisodecyl phthalate, dicyclohexyl phthalate, diphenyl phthalate, dimethyl isophthalate, diethyl isophthalate, dinormalbutyl isophthalate, diisobutyl isophthalate, di-tert-butyl isophthalate, dimethyl terephthalate, diethyl terephthalate, dinormalbutyl terephthalate, diisobutyl terephthalate, di-tert-butyl terephthalate and the like. Preferable examples include methyl acetate, ethyl acetate, methyl benzoate, ethyl benzoate, dimethyl phthalate, diethyl phthalate, dinormalbutyl phthalate, diisobutyl phthalate, dimethyl terephthalate, and diethyl terephthalate, and more preferable examples include methyl benzoate, dimethyl phthalate, diethyl phthalate, diisobutyl phthalate and dimethyl terephthalate.

Examples of the amines include trihydrocarbylamine and examples include trimethylamine, triethylamine, tripropylamine, trinormalbutylamine, triisobutylamine, trihexylamine, trioctylamine, tridodecylamine, and triphenylamine. Preferable examples include triethylamine and trioctylamine.

As the electron donating compound (D), alkoxysilanes, ethers or amines are preferably used. Further, amines are more preferably used. One of these electron donating compounds (D) may be used, or two or more the electron donating compounds (D) may be used.

A process for producing the addition polymer of the present invention includes the following two processes:

(1) a process for producing an addition polymer by addition polymerizing addition polymerizable monomers using a catalyst in a solvent to which a surfactant-containing particle has been added, (2) a process for producing an addition polymer by pre-polymerizing addition polymerizable monomers using a catalyst in a solvent to which a surfactant-containing particle has been added, to obtain a pre-polymerized addition polymerization catalyst component, and addition polymerizing addition polymerizable monomers in the presence of the pre-polymerized addition polymerization catalyst component.

Examples of the solvent include an aliphatic hydrocarbon solvent such as butane, pentane, hexane, heptane and octane, an aromatic hydrocarbon solvent such as benzene and toluene, and a halogenated hydrocarbon solvent such as dichloromethane. Alternatively, a monomer itself can be also used as a solvent, and examples of the monomer include ethylene, propylene, 1-butene and 1-hexene.

An addition amount of the surfactant-containing particle relative to the solvent is such that an amount of the surfactant relative to the solvent is preferably in a range of 0.01 to 1000 µmol/L, and more preferably in a range of 0.05 to 100 µmol/L.

It is preferable to add the surfactant-containing particle to a solvent which is being stirred.

A method of adding the surfactant-containing particle to the solvent is not particularly limited, but examples include a method of adding only the surfactant-containing particle to the solvent, a method of dispersing the surfactant-containing particle in the solvent once to form a slurry, and adding the slurry to the same solvent as the aforementioned solvent, a method of dispersing the surfactant-containing particle in the solvent to form a slurry, and adding the slurry to a solvent different from the aforementioned solvent, a method of adding the surfactant-containing particle together with an inert gas stream to the solvent, and a method of adding the surfactant-containing particle together with a monomer gas stream to the solvent.

A temperature upon addition of the surfactant-containing particle to the solvent is not particularly limited. It is usually 0° C. to 150° C., preferably 5° C. to 100° C., and further preferably 10° C. to 80° C.

A contacting time for the surfactant-containing particle with the solvent is arbitrary, and is preferably 5 hours or shorter, more preferably 3 hours or shorter, and further preferably 1 hour or shorter.

Catalyst

The catalyst to be used in the present invention is obtained by bringing the component (A), the component (B) and, if necessary, the component (C) into contact with one another. As a contact amount ratio of each component, a contact amount of the component (A) relative to the component (B) is usually 0.1 to 1000 µmol/g, preferably 1 to 500 µmol/g, and more preferably 10 to 300 µmol/g. A contact amount of the component (C) relative to the component (A) is usually 0.01 to 10000 mmol/g, preferably 0.1 to 1000 mmol/g, and more preferably 0.5 to 200 mmol/g.

A method of bringing the compound (A), the activating agent (B) and the organoaluminum compound (C) into contact with one another is not particularly limited, examples include the methods of the following <13> to <15>.

<13> a method of placing a contact product obtained by bringing the above respective components into contact with one another in a polymerization tank.

<14> a method of supplying the above respective components to a polymerization tank separately, and bringing them into contact with one another in the polymerization tank.

<15> a method of bringing a part of the above respective components into contact with one another before a placement into a polymerization tank, to obtain a pre-contact product, and bringing the pre-contact product and remaining components into contact with one another in the polymerization tank.

The contacting method is preferably the <14>. The compound (A) may be placed into the polymerization tank in powder state or in the slurry state where the compound (A) is suspended in a solvent.

An order of bringing the compound (A), the activating agent (B) and the organoaluminum compound (C) into contact with one another is not particularly limited, examples thereof include the order of the following <16> to <21>.

<16> a contact product obtained by bringing the compound (A) and the activating agent (B) into contact with each other is contacted with the organoaluminum compound (C).

<17> a contact product obtained by bringing the compound (A) and the organoaluminum compound (C) into contact with each other is brought into contact with the activating agent (B).

<18> a contact product obtained by bringing the activating agent (B) and the organoaluminum compound (C) into contact with each other is brought into contact with the compound (A).

<19> a contact product obtained by bringing the compound (A) and the organoaluminum compound (C) into contact with each other is brought into contact with a contact product obtained by bringing the activating agent (B) and the organoaluminum compound (C) into contact with each other.

<20> a contact product obtained by bringing the compound (A) and the activating agent (B) with each other is brought into contact with a contact product obtained by bringing the activating agent (B) and the organoaluminum compound (C) into contact with each other.

<21> a contact product obtained by bringing the compound (A) and the organoaluminum compound (C) into contact with each other is brought into contact with a contact product obtained by bringing the compound (A) and the activating agent (B) into contact with each other.

A contacting order is preferably the <16>.

And, when respective components are brought into contact with each other, a solvent may be used. It is preferable to use a solvent because an active point can be formed effectively. As the solvent used upon contacting, a solvent which does not inactivate a generated active point may be used. And, a solvent in which the component (A) is dissolved is further preferable, and specifically, an aliphatic hydrocarbon solvent such as butane, pentane, hexane, octane and the like, an aromatic hydrocarbon solvent such as benzene, toluene, xylene and the like, a halogenated hydrocarbon solvent such as dichloromethane, and polar solvents such as ethers, esters, ketones and the like can be also used. When used in polymerization for forming a particle (e.g. slurry polymerization, vapor phase polymerization, bulk polymerization etc.), a solvent in which a generated addition polymer is not dissolved is preferable, and specifically, an aliphatic hydrocarbon solvent is preferable. And, monomers may be present at contacting.

A temperature upon contacting of the respective components is arbitrary. A contacting temperature is usually −50° C. to 100° C., preferably −30° C. to 80° C., and further preferably −10° C. to 60° C. A contacting time for the respective components is arbitrary. The contacting time is usually from substantially 0 minute to 24 hours, preferably 1 minute to 12 hours, and further preferably 3 minutes to 10 hours. That the contacting time is substantially 0 minute means that the components are fed continuously.

It is preferable to bring the respective components into contact with one another while stirring them.

Addition Polymerization Method Using Catalyst

An addition polymerization method using a catalyst is a method of addition polymerizing monomers using a catalyst in a solvent.

Examples of the addition polymerization using a catalyst include a solution polymerization method of polymerizing monomers in a solvent, a slurry polymerization method (suspension polymerization method), or a bulk polymerization method of polymerizing liquid monomers.

Examples of the solvent used in addition polymerization using a catalyst include an aliphatic hydrocarbyl solvent such as butane, pentane, hexane, heptane and octane, an aromatic hydrocarbyl solvent such as benzene and toluene, and a halogenated hydrocarbyl solvent such as dichloromethane. Alternatively, a monomer itself can be also used as a solvent. The addition polymerization using a catalyst can be performed by a batch system or a continuous system. A polymerization time of the addition polymerization using a catalyst is generally determined by a kind of a target addition polymer, and a polymerization reactor used, and is usually 1 minute to 20 hours.

The addition polymerization using a catalyst can be performed according to the known method and condition. A preferable method is a method comprising continuously or intermittently supplying monomers, a solvent and, if necessary, other substance to be supplied to a polymerization reactor, and continuously or intermittently extracting the generated addition polymer from the polymerization reactor. As the polymerization reactor, a loop reactor, a reactor equipped with a stirrer, and a reactor in which a plurality of reactor units equipped with a stirrer which are different in a type and the polymerization reaction condition are connected in series, parallel or in combination of them can be used.

The solvent, as well as a polymerization temperature and a polymerization pressure are selected so that the solvent and at least a part of monomers can be maintained in a liquid phase, and the monomers and a catalyst can be brought into contact with one another. The polymerization temperature is usually about −50° C. to about 150° C. The polymerization pressure is usually about 0.001 MPa to about 10 MPa.

In the addition polymerization using a catalyst, a catalyst or components used for obtaining the catalyst, and monomers can be supplied to a polymerization reactor in an arbitrary order by the known method. Examples of a method of supplying them to the polymerization reactor include (1) a method of supplying a catalyst or components to be used for obtaining the catalyst, and monomers simultaneously, (2) a method of supplying a catalyst or components to be used for obtaining the catalyst and monomers sequentially.

The addition polymer obtained in the addition polymerization using a catalyst is particularly preferably copolymers of ethylene and an α-olefin and, among them, preferable is a copolymer that is obtained by copolymerizing ethylene and an α-olefin and that has a polyethylene crystal structure. As the α-olefin, for example, an α-olefin having 3 to 8 carbon atoms is preferable, and examples thereof include 1-butene, 1-hexene, and 1-octene.

Control of a molecular weight of the resulting addition polymer can be performed by selecting a polymerization temperature or a molecular weight regulating agent such as hydrogen.

Pre-Polymerization Method and Pre-Polymerized Addition Polymerization Catalyst Component Among the addition polymerization methods using the catalyst of the present invention, a method of pre-polymerizing addition polymerizable monomers to obtain a pre-polymerized addition polymerization catalyst component is particularly referred to as pre-polymerization method.

Pre-polymerization can be performed by the same method and condition as those of the addition polymerization. Pre-polymerization can be performed by a batch system or a continuous system. Pre-polymerization can be performed in two or more stages under different reaction conditions. A pre-polymerization time is generally appropriately determined depending on a kind of a target olefin polymer, and a reaction apparatus, and is usually 1 minute to 20 hours. A pre-polymerization temperature is usually −50° C. to 100° C., preferably −30° C. to 80° C., and further preferably −10° C. to 60° C. The temperature may be changed on the way. The pressure under which the pre-polymerization is performed is usually 0.001 MPa to 5 MPa, and preferably 0.01 MPa to 2 MPa.

In the pre-polymerization in the present invention, a catalyst or components to be used for obtaining the catalyst, and monomers can be supplied to a polymerization reactor by the same method as that of the addition polymerization.

The monomer used in pre-polymerization can be arbitrarily selected from an addition polymerizable monomer. The addition polymerizable monomer will be described later.

When a pre-copolymer is formed using simultaneously two or more monomers in pre-polymerization, examples of a combination of monomers constituting the copolymer include combinations of ethylene and propylene, ethylene and 1-butene, ethylene and 1-hexene, and propylene and 1-butene.

By the presence of a molecular weight regulating agent such as hydrogen and the like in pre-polymerization, the molecular weight of the pre-polymer can be also regulated.

After a pre-polymerized addition polymerization catalyst component is formed by pre-polymerization, the resulting pre-polymerized addition polymerization catalyst component may be used as it is in main polymerization, or may be used after the following treatment is performed. When the pre-polymerized addition polymerization catalyst component is formed by a method of performing pre-polymerization in the presence of a solvent, the pre-polymerized addition polymerization catalyst component may be used in the solution or slurry liquid state, or treatment such as de-monomer, solvent distillation off, filtration, washing and drying is performed, and the component may be used in the solid state in main polymerization. When the surfactant-containing particle of the present invention is contained in the pre-polymerized addition polymerization catalyst component, after the surfactant-containing particle is removed utilizing a difference in a particle diameter or a difference in a specific gravity between the pre-polymerized addition polymerization catalyst component and the surfactant-containing particle, the pre-polymerized addition polymerization catalyst component may be used in main polymerization. Examples of a method of removing the surfactant-containing particle include a method of sieve-classifying the pre-polymerized addition polymerization catalyst component containing the surfactant-containing particle under the inert gas atmosphere.

It is preferable that a content of a fine powder in the pre-polymerized addition polymerization catalyst component is smaller, from a view point that operation stability of main polymerization using the pre-polymerized addition polymerization catalyst component is enhanced. The content of a fine powder in the pre-polymerized addition polymerization catalyst component is assessed by, for example, a content of particles of 60 μm or less. The content of particles of 60 μm or less in the pre-polymerized addition polymerization catalyst component is preferably 6.5% or less, more preferably 3.0% or less, further preferably 1.5% or less, and particularly preferably 0.8% or less. The content of a fine powder in the pre-polymerized addition polymerization catalyst component can be changed by adjusting a median diameter or SPAN of the activating agent (B) used in pre-polymerization, or a kind of a surfactant constituting the surfactant-containing particle to be added to a pre-polymerization solvent.

Pre-polymerization is performed so that an amount of a polymer generated by pre-polymerization (also referred to as pre-polymerization degree) can be usually in a range of 0.1 to 1000 g, preferably in a range of 0.5 to 500 g per 1 g of the component (B), and particularly preferably in a range of 1 to 100 g.

Main Polymerization

In the present invention, addition polymerization using a pre-polymerized addition polymerization catalyst component is referred to as main polymerization. Upon main polymerization, the resulting pre-polymerized addition polymerization catalyst component may be used as it is as a catalyst for addition polymerization, or a contact product of the pre-polymerized addition polymerization catalyst component and an organoaluminum compound may be used as a catalyst for addition polymerization. From a view point of being excellent in the polymerization activity, the latter is preferable. As the organoaluminum compound in the case of the latter, the organoaluminum compound described as the compound (C) is used. When the organoaluminum compound is used like this, a use amount thereof is usually 1 to 10000 mol/mol, preferably 10 to 5000 mol/mol, and more preferably 30 to 1000 mol/mol relative to the compound (A).

When the pre-polymerized addition polymerization catalyst component and the organoaluminum compound (C) are used in contact with each other, the pre-polymerized polymerization catalyst component and the organoaluminum compound (C) can be used by placing them into a polymerization reactor in an arbitrary order, or they may be used by placing them into the polymerization reactor after they are preliminarily brought into contact with one another.

A method of supplying the pre-polymerized addition polymerization catalyst component of the present invention and the organoaluminum compound (C) to a reactor for preparing a catalyst or a polymerization reactor for main polymerization is not particularly limited. Examples of the method include a method of supplying a pre-polymerized addition polymerization catalyst component and an organoaluminum compound (C) in the solid state, and a method of supplying both components in the solution state where the pre-polymerized addition polymerization catalyst component and the organoaluminum compound (C) are dissolved in a hydrocarbyl solvent from which water and a component inactivating a catalyst component such as oxygen and the like have been sufficiently removed, or in the state where they are suspended or slurried in such the hydrocarbyl solvent. Examples of the hydrocarbyl solvent include an aliphatic hydrocarbyl solvent such as butane, pentane, hexane, heptane and octane, an aromatic hydrocarbyl solvent such as benzene and toluene, and a halogenated hydrocarbyl solvent such as dichloromethane and, among them, an aliphatic hydrocarbyl solvent or an aromatic hydrocarbyl solvent is preferable, and an aliphatic hydrocarbyl solvent is further preferable.

A polymerization method in main polymerization is not particularly limited. Examples of the method include (1) a vapor phase polymerization method of polymerizing gaseous monomers, (2) a solution polymerization method or a slurry polymerization method (suspension polymerization method) of polymerizing monomers in a solvent, and (3) a bulk polymerization method of polymerizing liquid monomers. Main polymerization can be performed by a batch system or a continuous system. Main polymerization can be performed by dividing two or more stages under the different reaction conditions. A polymerization time of main polymerization is generally determined depending on a kind of a target addition polymer, and a polymerization reactor used, and is usually 1 minute to 20 hours.

When main polymerization is solution polymerization, slurry polymerization or bulk polymerization, the polymerization can be performed according to the known method and condition. A preferable method of the polymerization method is a method of continuously or intermittently supplying monomers (and comonomers), a diluent and, if necessary, other substance to be supplied to a polymerization reactor, and continuously or intermittently extracting the generated addition polymer from the polymerization reactor. Examples of the polymerization reactor include a loop reactor, a reactor equipped with a stirrer, and a reactor in which a plurality of reactor units equipped with a stirrer which are different in a type and the polymerization reaction condition are connected in series, parallel or in combination of them.

When main polymerization is vapor phase polymerization, the vapor phase polymerization can be performed according to the known method and condition. A reactor for the vapor phase polymerization is a fluidized reaction tank, preferably a fluidized reaction tank having an expanded section. The reactor may have a stirring wing in a reaction tank. Examples of a method of supplying a pre-polymerized addition polymerization catalyst component to a polymerization tank include a method of supplying the component together with an inert gas such as nitrogen and argon, hydrogen, or ethylene in the state where water does not exist, or a method of supplying a pre-polymerized addition polymerization catalyst component in a solution in which the component is dissolved in a solvent, or in a slurry where the component is diluted in a solvent.

When main polymerization is vapor phase polymerization, a polymerization temperature of the vapor phase polymerization is not particularly limited as far as it is lower than a melting point of a produced addition polymer, but is preferably 0° C. to 150° C., and particularly preferably 30° C. to 100° C. For the purpose of regulating melt flowability of a produced addition polymer, hydrogen as a molecular weight regulating agent may be added. And, when a gaseous monomer is polymerized, an inert gas may be present in a gas.

A monomer used in main polymerization can be arbitrarily selected from addition polymerizable monomers. The addition polymerizable monomer will be described later.

An addition polymer obtained by main polymerization is particularly preferably copolymers of ethylene and an α-olefin and, among them, preferable is a copolymer that is obtained by copolymerizing ethylene and an α-olefin and that has a polyethylene crystal structure. As the α-olefin, for example, an α-olefin having 3 to 8 carbon atoms is preferable, and examples include 1-butene, 1-hexene and 1-octene.

Addition Polymerizable Monomer

Examples of the addition polymerizable monomer used in the present invention include an olefin having 2 to 20 carbon atoms, diolefin, cyclic olefin, alkenyl aromatic hydrocarbyl, and a polar monomer, and two or more kinds of monomers can be also used simultaneously.

Examples of the monomer include polar monomers such as olefins such as ethylene, propylene, 1-butene, 1-pentene, 4-methyl-1-pentene, 5-methyl-1-hexene, 1-hexene, 1-heptene, 1-octene, 1-nonene, 1-decene, and vinylcyclohexane; diolefins such as 1,5-hexadiene, 1,4-hexadiene, 1,4-pentadiene, 1,7-octadiene, 1,8-nonadiene, 1,9-decadiene, 4-methyl- 1,4-hexadiene, 5-methyl-1,4-hexadiene, 7-methyl-1,6-octadiene, 5-ethylidene-2-norbornene, dicyclopentadiene, 5-vinyl-2-norbornene, norbornadiene, 5-methylene-2-norbornene, 1,5-cyclooctadiene, 5,8-endomethylenehexahydronaphthalene, 1,3-butadiene, isoprene, 1,3-hexadiene, 1,3-octadiene, 1,3-cyclooctadiene, and 1,3-cyclohexadiene; cyclic olefins such as norbornene, 5-methyl-2-norbornene, 5-ethyl-2-norbornene, 5-butyl-2-norbornene, 5-phenyl-2-norbornene, 5-benzyl-2-norbornene, tetracyclododecene, tricyclodecene, tricycloundecene, pentacyclopentadecene, pentacyclohexadecene, 8-methyltetracyclododecene, 8-ethyltetracyclododecene, 5-acetyl-2-norbornene, 5-acetyloxy-2-norbornene, 5-methoxycarbonyl-2-norbornene, 5-ethoxycarbonyl-2-norbornene, 5-methyl-5-methoxycarbonyl-2-norbornene, 5-cyano-2-norbornene, 8-methoxycarbonyltetracyclododecene, 8-methyl-8-tetracyclododecene, and 8-cyanotetracyclododecene; alkenyl aromatic hydrocarbyls such as styrene, alkenylbenzene (e.g., 2-phenylpropylene, 2-phenylbutene, and 3-phenylpropylene), alkylstyrene(e.g., p-methylstyrene, m-methylstyrene, o-methylstyrene, p-ethylstyrene, m-ethylstyrene, o-ethylstyrene, α-methylstyrene, 2,4-dimethylstyrene, 2,5-dimethylstyrene, 3,4-dimethylstyrene, 3,5-dimethylstyrene, 3-methyl-5-ethylstyrene, 1,1-diphenylethylene, p-tertiary-butylstyrene, and p-secondary butylstyrene), and bisalkenylbenzene(e.g., divinylbenzene), alkenylnaphthalene (e.g., 1-vinylnaphthalene); α,β-unsaturated carboxylic acids (e.g., acrylic acid, methacrylic acid, fumaric acid, maleic anhydride, itaconic acid, itaconic anhydride, and bicyclo(2,2,1)-5-heptene-2,3-dicarboxylic acid); the α,β-unsaturated carboxylic acid metal salts such as sodium, potassium, lithium, zinc, magnesium, and calcium; α,β-unsaturated carboxylic acid esters (e.g., methyl acrylate, ethyl acrylate, n-propyl acrylate, isopropyl acrylate, tert-butyl acrylate, 2-ethylhexyl acrylate, methyl methacrylate, ethyl methacrylate, n-propyl methacrylate, isopropyl methacrylate, n-butyl methacrylate, and isobutyl methacrylate), unsaturated dicarboxylic acids (e.g., maleic acid and itaconic acid), vinyl esters (e.g., vinyl acetate, vinyl propionate, vinyl caproate, vinyl caprylate, vinyl laurate, vinyl stearate, and vinyl trifluoroacetate), and unsaturated carboxylic acid glycidyl esters (e.g., glycidyl acrylate, glycidyl methacrylate, and itaconic acid monoglycidyl ester).

The monomer used in the present invention is preferably ethylene and an α-olefin.

EXAMPLES

The present invention will be explained in more detail below by way of Examples and Comparative Examples, but the present invention is not limited to them. Elementary analysis of the modified particles used in Examples was measured by the following method.

(1) Elementary analysis

Zn: After adding a sample in an aqueous sulfuric acid solution (1M), ultrasonic waves were applied to the aqueous sulfuric acid solution containing the sample thereby extracting a metal component. Zn in a liquid portion of the aqueous sulfuric acid solution containing the metal component was quantitatively determined by ICP spectrometry.

F: A sample was combusted in a flask filled with oxygen and the generated combustion gas was absorbed in an aqueous sodium hydroxide solution (10%), and then F in the obtained aqueous solution was quantitatively determined using an ionic electrode method.

(2) an Accumulation Weight Fraction of Particles Having a Particle Diameter of 60 μm or Less in Pre-Polymerized Addition Polymerization Catalyst Component Using a laser diffraction particle size distribution measuring apparatus HELOS & RODOS system manufactured by SYMPATEC Inc, a pre-polymerized addition polymerization catalyst component was dispersed at an ejection pressure (dispersing pressure) of 1.5 bar in the dry state, a particle size distribution was measured, and an amount of the pre-polymerized addition polymerization catalyst component having a particle size of 60 μm or less was calculated in terms of a volume.

(3) Amount of Water in Surfactant-containing Particle

The amount was measured with a Karl Fischer Moisture meter at a sample heating temperature of 250° C.

(4) Median Diameter and SPAN of ethylene-1-butene-1-hexene Copolymer Powder

Using a laser diffraction particle size distribution measuring apparatus HELOS & RODOS system manufactured by SYMPATEC Inc, an ethylene/1-butene/1-hexene copolymer was dispersed at an ejection pressure (dispersing pressure) of 1.8 bar in the dry state, and a median diameter and SPAN were measured.

Example 1

(1) Production of Surfactant-containing Particle

To a washed 20 L Henschel mixer were added 2 kg of an ethylene/1-butene/1-hexene copolymer powder (median diameter 1.5 mm, SPAN 1.59) and 310 g of KAO AKYPO RLM-100NV (manufactured by Kao Corporation, 23.5% aqueous solution of $C_{12}H_{25}$—O—(—$C_2H_4$—O)$_{10}$—COONa), the materials were mixed at an ambient temperature for 5 minutes, and heat-dried at 50° C. for 24 hours to obtain a surfactant-containing particle having a surfactant component concentration of 50 mmol/kg. The resulting surfactant-containing particle was a powder having good flowability.

(2) Production of Modified Particle (B)

According to the same manner as that of preparation of a component (A) of Example 1 (1) and (2) of JP 2009-79180 A, a modified particle (B) in the present specification was produced. As a result of elementary analysis, Zn=11 wt %, and F=6.4 wt %.

(3) Pre-polymerization

After 1.0 g of the surfactant-containing particle obtained in the (1) was added to a 3 L autoclave which had been replaced with argon after drying under reduced pressure, the autoclave was evacuated, and 480 g of butane and 184 mg (345 mol) of ethylenebis(indenyl)zirconium diphenoxide (A) were added. The mixture was stirred at 50° C. for 2 hours, and cooled to 30° C. Then, 1 g of ethylene was added, 7.4 g of the modified particle (B) obtained in the (2) was added and, then, 3.5 ml (3.5 mmol) of a hexane solution of triisobutylaluminum (C), a concentration of which had been adjusted to 1.0 mmol/ml, was added. Initially, pre-polymerization was performed at 30° C. for 30 minutes while ethylene was supplied at 0.13 g/min. Then, a gas was switched to an ethylene/hydrogen-mixed gas (hydrogen concentration: 0.207 mol %), a temperature was raised to 50° C. over 30 minutes while the gas was supplied at 0.81 g/min and, subsequently, pre-polymerization was performed at 50° C. for 2 hours. A monomer and butane were purged, and a pre-polymerized addition polymerization catalyst component was recovered. A recovery amount was 122.4 g, and a polymerization degree per the activating agent (B) was 16.6 g/g. A polymer was not adhered to an inner wall of the autoclave. As a result of measurement of a particle size distribution, an amount of particles having a particle diameter of 60 μm or less contained in the pre-polymerized addition polymerization catalyst component was 0.2%.

(4) Main Polymerization

After drying under reduced pressure, the interior of an internal volume 5 liter of an autoclave equipped with a stirrer, replaced with argon, was evacuated, hydrogen was added at a partial pressure of 0.037 MPa, 154 g of hexene-1 and 1046 g of butane were placed, and a temperature was raised to 70° C. Thereafter, ethylene was added so that a partial pressure thereof might become 1.6 MPa, to stabilize the system. As a result of gas chromatography analysis, a gas composition in the system was hydrogen=1.96 mol %. Into this was placed 2.0 ml of a hexane solution of triisobutylaluminum, a concentration of which had been adjusted to 1 mmol/ml. Then, 1.0 ml of a toluene solution of triethylamine, a concentration of which had been adjusted to 0.1 mmol/ml, was added. Further, 331.8 mg of the pre-polymerized addition polymerization catalyst component obtained in the (3) was placed. Polymerization was performed at 70° C. for 3 hours while an ethylene/hydrogen mixed gas (hydrogen 0.316 mol %) was fed so that total pressure might be retained constant. As a result, 48.3 g of an olefin polymer was obtained.

Example 2

(1) Production of Surfactant-containing Particle

To a washed 20 L Henshel mixer were added 2 kg of a powder of an ethylene/1-butene/1-hexene copolymer (median diameter 1.5 mm, SPAN 1.59) and 30 g of Chemistat 2500 (manufactured by Sanyo Chemical Industries, Ltd., chemical substance of $C_{12}H_{25}CON(C_2H_{40}H)_2$), the materials were mixed at an ambient temperature for 5 minutes, and heat-dried at 50° C. for 24 hours to obtain a surfactant-containing particle having a surfactant component concentration of 50 mmol/kg. The resulting surfactant-containing particle was a powder having good flowability.

(2) Pre-polymerization

To a 3 L autoclave which had been replaced with argon after drying under reduced pressure was added 1.0 g of the surfactant-containing particle obtained in the (1), the autoclave was evacuated, and 480 g of butane and 206 mg (386 μmol) of ethylenebis(indenyl)zirconium diphenoxide (A) were added. The mixture was stirred at 50° C. for 2 hours, and cooled to 30° C. Then, 1 g of ethylene was added, 7.1 g of the modified particle (B) obtained in Example 1 (2) was added and, then, 3.5 ml (3.5 mmol) of a hexane solution of triisobutylaluminum (C), a concentration of which had been adjusted to 1.0 mmol/ml, was added. Initially, pre-polymerization was performed at 30° C. for 30 minutes while ethylene was supplied at 0.13 g/min. Then, a gas was switched to an ethylene/hydrogen mixed gas (hydrogen concentration: 0.206 mol %), a temperature was raised to 50° C. for 30 minutes while the gas was supplied at 0.81 g/min and, subsequently, pre-polymerization was performed at 50° C. for 2 hours. A monomer and butane were purged, and a pre-polymerized addition polymerization catalyst component was recovered. A recovery amount was 129.4 g, and a polymerization degree per activating agent (B) was 18.1 g/g. A polymer was not adhered to an inner wall of the autoclave. As a result of measurement of a particle diameter distribution, an amount of particles having a particle diameter of 60 μm or less contained in the pre-polymerized addition polymerization catalyst component was 2.8%.

Example 3

(1) Production of Surfactant-containing Particle

To a washed 20 L Henshel mixer were added 2 kg of a powder of an ethylene/1-butene/1-hexene copolymer (median diameter 1.5 mm, SPAN 1.59) and 70 g of KAO AKIPO RLM-100 (manufactured by Kao Corporation, 89% aqueous solution of $C_{12}H_{25}—O—(—C_2H_4—O)_{10}—COOH$), the materials were mixed at an ambient temperature for 5 minutes, and heat-dried at 50° C. for 24 hours to obtain a surfactant-containing particle having a surfactant component concentration of 50 mmol/kg. The resulting surfactant-containing particle was a powder having good flowability.

(2) Pre-polymerization

To a 3 L autoclave which had been replaced with argon after drying under reduced pressure was added 1.0 g of the surfactant-containing particle obtained in the (1), the autoclave was evacuated, and 480 g of butane and 207 mg (387 mol) of ethylenebis(indenyl)zirconium diphenoxide (A) were added. The mixture was stirred at 50° C. for 2 hours, and cooled to 30° C. Then, 1 g of ethylene was added, 7.0 g of the modified particle (B) obtained in Example 1(2) was added and, then, 3.5 ml (3.5 mmol) of a hexane solution of triisobutylaluminum (C), a concentration of which had been adjusted to 1.0 mmol/ml, was added. Initially, pre-polymerization was performed at 30° C. for 30 minutes while ethylene was supplied at 0.13 g/min. Then, the gas was switched to an ethylene/hydrogen mixed gas (hydrogen concentration: 0.206 mol %), a temperature was raised to 50° C. over 30 minutes while the gas was supplied at 0.81 g/min and, subsequently, pre-polymerization was performed at 50° C. for 2 hours. A monomer and butane were purged, and a pre-polymerized addition polymerization catalyst component was recovered. A recovery amount was 129.8 g, and a polymerization degree per activating agent (B) was 18.6 g/g. A polymer was not adhered to an inner wall of the autoclave. As a result of measurement of a particle size distribution, an amount of particles having a particle diameter of 60 μm or less contained in the pre-polymerized addition polymerization catalyst component was 1.0%.

Example 4

(1) Production of Surfactant-containing Particle

To a washed 20 L Henshel mixer were added 2 kg of a powder of an ethylene/1-butene/1-hexene copolymer (median diameter 1.5 mm, SPAN 1.59) and 50 g of Emal 270J (manufactured by Kao Corporation, 70% aqueous solution of $C_{12}H_{25}—O—(—C_2H_4—O)_2—SO_3Na$), the materials were mixed at an ambient temperature for 5 minutes, and heat-dried at 50° C. for 24 hours to obtain a surfactant-containing particle having a surfactant component concentration of 50 mmol/kg. The resulting surfactant-containing particle was a powder having good flowability.

(2) Pre-polymerization

To a 3 L autoclave which had been replaced with argon after drying under reduced pressure was added 1.0 g of the surfactant-containing particle obtained in the (1), the autoclave was evacuated, and 480 g of butane and 194 mg (364 μmol) of ethylenebis(indenyl)zirconium diphenoxide (A) were added. The mixture was stirred at 50° C. for 2 hours, and cooled to 30° C. Then, 1 g of ethylene was added, 7.0 g of the modified particle (B) obtained in Example 1 (2) was added and, then, 3.5 ml (3.5 mmol) of a hexane solution of triisobutylaluminum (C), a concentration of which had been adjusted to 1.0 mmol/ml, was added. Initially, pre-polymerization was performed at 30° C. or 30 minutes while an ethylene was supplied at 0.13 g/min. Then, the gas was switched to an ethylene/hydrogen mixed gas (hydrogen concentration: 0.206 mol %), a temperature was raised to 50° C. over 30 minutes while the gas was supplied at 0.81 g/min and, subsequently, pre-polymerization was performed at 50° C. for 2 hours. A monomer and butane were purged, and a pre-polymerized addition polymerization catalyst component was recovered. A recovery amount was 135.6 g, and a polymerization degree per activating agent (B) was 19.5 g/g. A polymer was not adhered to an inner wall of the autoclave. As a result of measurement of a particle size distribution, an amount of particles having a particle diameter of 60 μm or less contained in the pre-polymerized addition polymerization catalyst component was 3.5%.

Comparative Example 1

(1) Pre-polymerization

To a 3 L autoclave which had been replaced with argon after drying under reduced pressure was added 1.0 g of a powder of an ethylene/1-butene/1-hexene copolymer (median diameter 1.5 mm, SPAN 1.59), the autoclave was evacuated, and 480 g of butane and 198 mg (372 μmol) of ethylenebis(indenyl)zirconium diphenoxide (A) were added. The materials were stirred at 50° C. for 2 hours, and cooled to 30° C. Then, 1 g of ethylene was added, and 6.8 g of the modified particle (B) obtained in Example 1 (2) was added and, then, 3.5 ml (3.5 mmol) of a hexane solution of triisobutylaluminum (C), a concentration of which had been adjusted to 1.0 mmol/ml, was added. Initially, pre-polymerization was performed at 30° C. for 30 minutes while ethylene was supplied at 0.13 g/min. Then, the gas was switched to an ethylene/hydrogen mixed gas (hydrogen concentration: 0.208 mol %), a temperature was raised to 50° C. over 30 minutes while the gas was supplied at 0.81 g/min and, subsequently, pre-polymerization was performed at 50° C. for 2 hours. A monomer and butane were purged, and the pre-polymerized addition polymerization catalyst component was recovered. A recovery amount was 132.9 g, 22.6 g of which was adhered to an inner wall of the autoclave. A polymerization degree per activating agent (B) was 19.5 g/g. As a result of measurement of a particle size distribution, an amount of particles having a particle diameter of 60 μm or less contained in the pre-polymerized addition polymerization catalyst component was 6.9%.

TABLE 1

| | Surfactant | Amount of water contained in surfactant-containing particle [wt %] | |
|---|---|---|---|
| | | Before heat-drying | After heat-drying |
| Example 1 | 1 | 8.7 | 0.4 |
| Example 2 | 2 | 0.2 | 0.1 |
| Example 3 | 3 | 0.3 | 0.2 |
| Example 4 | 4 | 0.5 | 0.3 |

1 = $C_{12}H_{25}$—O—(—$C_2H_4$—O)$_{10}$—COONa
2 = $C_{12}H_{25}$CON($C_2H_4$OH)$_2$
3 = $C_{12}H_{25}$—O—(—$C_2H_4$—O)$_{10}$—COOH
4 = $C_{12}H_{25}$—O—(—$C_2H_4$—O)$_2$—SO$_3$Na

The invention claimed is:

1. A method of polymerizing addition polymerizable monomers comprising contacting addition polymerizable monomers with a catalyst in a solvent comprising a surfactant-containing particle, wherein the surfactant-containing particle is obtained by mixing a particle of an inorganic compound or an organic polymer with at least one surfactant having formula [1]:

$$R^1-O-(-R^2-O-)_m-Q^1 \quad [1]$$

wherein $R^1$ is a substituted or unsubstituted hydrocarbyl group having 1 to 30 carbon atoms, $R^2$ is a substituted or unsubstituted alkylene group having 1 to 20 carbon atoms, m is a number of 1 to 100, multiple $R^2$ groups may be the same or different from each other, $Q^1$ is —C(=O)OM$^1$, —R$^3$—C(=O)OM$^1$, —S(=O)$_2$OM$^1$, —R$^3$—S(=O)$_2$OM$^1$, —P(=O)(OH)(OM$^1$), —P(=O)(OR$^4$)(OM$^1$), —R$^3$—P(=O)(OR$^4$)(OM$^1$), —P(=O)(OM$^1$)$_2$, or —R$^3$—P(=O)(OM$^1$)$_2$, $M^1$ is a hydrogen atom, NH$_4$, NH(R$^{12}$OH)$_3$ or an alkali metal atom, multiple $M^1$ groups may be the same or different from each other, $R^3$ is a substituted or unsubstituted alkylene group having 1 to 20 carbon atoms, $R^4$ is a substituted or unsubstituted hydrocarbyl group having 1 to 20 carbon atoms, $R^{12}$ is a substituted or unsubstituted alkylene group having 1 to 20 carbon atoms, and multiple $R^{12}$ groups may be the same or different from each other;

wherein the catalyst is formed by contacting (A) a transition metal compound having formula [3] or a μ-oxo type transition metal compound dimer thereof with (B) an activating agent:

$$L^1{}_aM^2X^1{}_b \quad [3]$$

wherein $M^2$ is a transition metal atom of Group 4 of the Periodic Table, $L^1$ is a group having a cyclopentadienide frame or a group containing a hetero atom, multiple $L^1$ groups may be linked to each other directly or via a residue containing a carbon atom, a silicon atom, a nitrogen atom, an oxygen atom, a sulfur atom or a phosphorus atom, $X^1$ is a halogen atom, a hydrocarbyl group other than a group having a cyclopentadienide frame, or a hydrocarbyloxy group, a is a number satisfying 0<a≤3, and b is a number satisfying 0<b≤3.

2. A method of polymerizing addition polymerizable monomers comprising contacting addition polymerizable monomers with a catalyst in a solvent comprising a surfactant-containing particle, wherein the surfactant-containing particle is obtained by mixing a particle of an inorganic compound or an organic polymer with at least one surfactant having formula [1]:

$$R^1-O-(-R^2-O-)_m-Q^1 \quad [1]$$

wherein $R^1$ is a substituted or unsubstituted hydrocarbyl group having 1 to 30 carbon atoms, $R^2$ is a substituted or unsubstituted alkylene group having 1 to 20 carbon atoms, m is a number of 1 to 100, multiple $R^2$ groups may be the same or different from each other, $Q^1$ is —C(=O)OM$^1$, —R$^3$—C(=O)OM$^1$, —S(=O)$_2$OM$^1$, —R$^3$—S(=O)$_2$OM$^1$, —P(=O)(OH)(OM$^1$), —R$^3$—P(=O)(OH)(OM$^1$), —P(=O)(OR$^4$)(OM$^1$), —R$^3$—P(=O)(OR$^4$)(OM$^1$), —P(=O)(OM$^1$)$_2$, or —R$^3$—P(=O)(OM$^1$)$_2$, $M^1$ is a hydrogen atom, NH$_4$, NH(R$^{12}$OH)$_3$ or an alkali metal atom, multiple $M^1$ groups may be the same or different from each other, $R^3$ is a substituted or unsubstituted alkylene group having 1 to 20 carbon atoms, $R^4$ is a substituted or unsubstituted hydrocarbyl group having 1 to 20 carbon atoms, $R^{12}$ is a substituted or unsubstituted alkylene group having 1 to 20 carbon atoms, and multiple $R^{12}$ groups may be the same or different from each other;

wherein the catalyst is formed by contacting (A) a transition metal compound having formula [3] or a μ-oxo type transition metal compound dimer thereof with (B) an activating agent and (C) an organoaluminum compound:

$$L^1{}_aM^2X^1{}_b \quad [3]$$

wherein $M^2$ is a transition metal atom of Group 4 of the Periodic Table, $L^1$ is a group having a cyclopentadienide frame or a group containing a hetero atom, multiple $L^1$ groups may be linked to each other directly or via a residue containing a carbon atom, a silicon atom, a nitrogen atom, an oxygen atom, a sulfur atom or a phosphorus atom, $X^1$ is a halogen atom, a hydrocarbyl group other than a group having a cyclopentadienide frame, or a hydrocarbyloxy group, a is a number satisfying $0<a \leq 3$, and b is a number satisfying $0<b \leq 3$.

3. The method according to claim 1, wherein the activating agent (B) is a modified particle obtained by contacting (a), (b), (c), and (d) with one another; wherein (a) is a compound represented by formula [4];

$$M^3L^2_2 \qquad [4]$$

(b) is a compound represented by formula [5];

$$R^6_{t-1}TH \qquad [5]$$

(c) is a compound represented by formula [6]; and $$R^7_{t-2}TH_2 \qquad [6]$$

(d) is an inorganic oxide particle or organic polymer particle;

and wherein $M^3$ is a main group metal atom of Group 12 of the Periodic Table, $L^2$ is a hydrogen atom, a halogen atom or a hydrocarbyl group and multiple $L^2$ groups may be the same or different from each other, $R^6$ is an electron withdrawing group or a group containing an electron withdrawing group and multiple $R^6$ groups may be the same or different from each other, $R^7$ is a hydrocarbyl group or a halogenated hydrocarbyl group, each T is independently an atom of Group 15 or Group 16 of the Periodic Table, and t is a number corresponding to a valence of T of each compound.

4. The method according to claim 1, further comprising pre-polymerizing the addition polymerizable monomers.

5. A pre-polymerized addition polymerization catalyst component obtained by the method according to claim 4.

6. A method for producing an addition polymer comprising polymerizing the addition polymerizable monomers using the pre-polymerized addition polymerization catalyst component according to claim 5.

7. A method for producing an addition polymer comprising polymerizing the addition polymerizable monomers using the pre-polymerized addition polymerization catalyst component according to claim 5 and an organoaluminum compound (C).

8. The method according to claim 6, wherein the polymerizable monomers comprise ethylene and an α-olefin.

9. The method according to claim 2, wherein the activating agent (B) is a modified particle obtained by contacting (a), (b), (c), and (d) with one another; wherein (a) is a compound represented by formula [4];

$$M^3L^2_2 \qquad [4]$$

(b) is a compound represented by formula [5];

$$R^6_{t-1}TH \qquad [5]$$

(c) is a compound represented by formula [6]; and $$R^7_{t-2}TH_2 \qquad [6]$$

(d) is an inorganic oxide particle or organic polymer particle;

and wherein $M^3$ is a main group metal atom of Group 12 of the Periodic Table, $L^2$ is a hydrogen atom, a halogen atom or a hydrocarbyl group and multiple $L^2$ groups may be the same or different from each other, $R^6$ is an electron withdrawing group or a group containing an electron withdrawing group and multiple $R^6$ groups may be the same or different from each other, $R^7$ is a hydrocarbyl group or a halogenated hydrocarbyl group, each T is independently an atom of Group 15 or Group 16 of the Periodic Table, and t is a number corresponding to a valence of T of each compound.

10. The method according to claim 2, further comprising pre-polymerizing the addition polymerizable monomers.

11. The method according to claim 7, wherein the polymerizable monomers comprise ethylene and an α-olefin.

* * * * *